United States Patent
Waragaya et al.

(10) Patent No.: US 10,960,810 B2
(45) Date of Patent: Mar. 30, 2021

(54) APPARATUS AND METHOD FOR CONTROLLING ADB-MODE VEHICLE HEADLAMP

(71) Applicant: Stanley Electric Co., Ltd., Tokyo (JP)

(72) Inventors: Takeshi Waragaya, Tokyo (JP); Mitsuhiro Uchida, Osaka (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 200 days.

(21) Appl. No.: 16/140,011

(22) Filed: Sep. 24, 2018

(65) Prior Publication Data

US 2019/0092222 A1 Mar. 28, 2019

(30) Foreign Application Priority Data

Sep. 25, 2017 (JP) .............................. JP2017-183569

(51) Int. Cl.
*B60Q 1/00* (2006.01)
*B60Q 1/08* (2006.01)
(Continued)

(52) U.S. Cl.
CPC ............. *B60Q 1/085* (2013.01); *B60Q 1/143* (2013.01); *B60Q 11/00* (2013.01); *B60W 40/072* (2013.01); *H05B 45/10* (2020.01); *H05B 47/105* (2020.01); *B60Q 2300/054* (2013.01); *B60Q 2300/056* (2013.01); *B60Q 2300/122* (2013.01); *B60Q 2300/322* (2013.01); *B60Q 2300/41* (2013.01); *B60Q 2300/45* (2013.01);
(Continued)

(58) Field of Classification Search
CPC ........ B60Q 1/085; B60Q 1/143; B60Q 11/00; B60Q 2300/054; B60Q 2300/056; B60Q 2300/122; B60Q 2300/322; B60Q 2300/41; B60Q 2300/45; H05B 45/10; H05B 47/105; B60W 40/072; B60W 2554/4041; F21W 2102/145
USPC ............................................................ 701/49
See application file for complete search history.

(56) References Cited

U.S. PATENT DOCUMENTS

| | | | |
|---|---|---|---|
| 2014/0029289 A1* | 1/2014 | Mochizuki | ............ F21S 41/143 362/525 |
| 2016/0069527 A1 | 3/2016 | Komatsu | |
| 2018/0170243 A1* | 6/2018 | Mizuno | .................. B60Q 1/143 |

FOREIGN PATENT DOCUMENTS

| | | |
|---|---|---|
| DE | 102014113478 A1 | 3/2016 |
| EP | 2275305 A1 | 1/2011 |

(Continued)

OTHER PUBLICATIONS

The extended European Search Report for the related European Patent Application No. 18196583.1 dated Feb. 5, 2019.

*Primary Examiner* — James M McPherson
*Assistant Examiner* — Tiffany P Ohman
(74) *Attorney, Agent, or Firm* — Kenealy Vaidya LLP

(57) ABSTRACT

An apparatus for controlling an adaptive drive beam mode vehicle headlamp of a subject vehicle travelling a road includes a headlamp driver adapted to drive the vehicle headlamp, a preceding vehicle determining section adapted to determine whether or not a preceding vehicle is travelling ahead of the subject vehicle, a road state determining section adapted to determine whether a state of the road is straight or curved, and a curved-mode illumination intensity pattern outputting section adapted to output a curved-mode illumination intensity pattern to the headlamp driver.

20 Claims, 21 Drawing Sheets

(51) Int. Cl.
*B60Q 11/00* (2006.01)
*B60Q 1/14* (2006.01)
*H05B 45/10* (2020.01)
*H05B 47/105* (2020.01)
*B60W 40/072* (2012.01)
*F21W 102/145* (2018.01)

(52) U.S. Cl.
CPC .............. *B60W 2554/4041* (2020.02); *F21W 2102/145* (2018.01)

(56) References Cited

FOREIGN PATENT DOCUMENTS

| | | |
|---|---|---|
| EP | 3153351 A1 | 4/2017 |
| EP | 3184884 A1 | 6/2017 |
| JP | 2013119294 A | 6/2013 |
| JP | 2015-102785 A | 6/2015 |
| JP | 2017-001620 A | 1/2017 |

\* cited by examiner

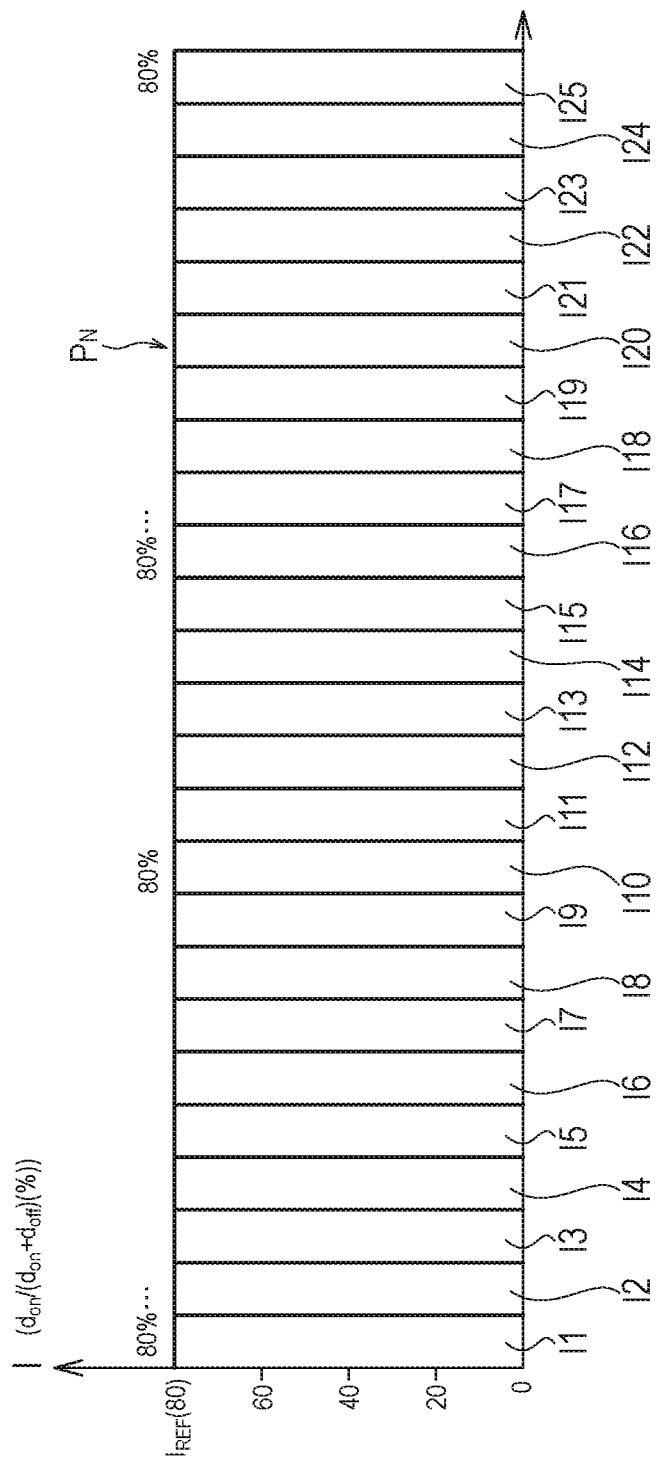

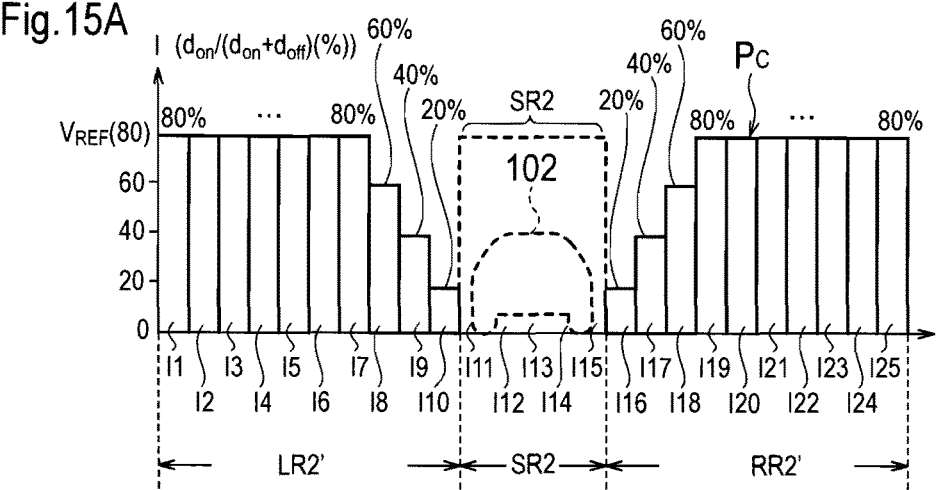
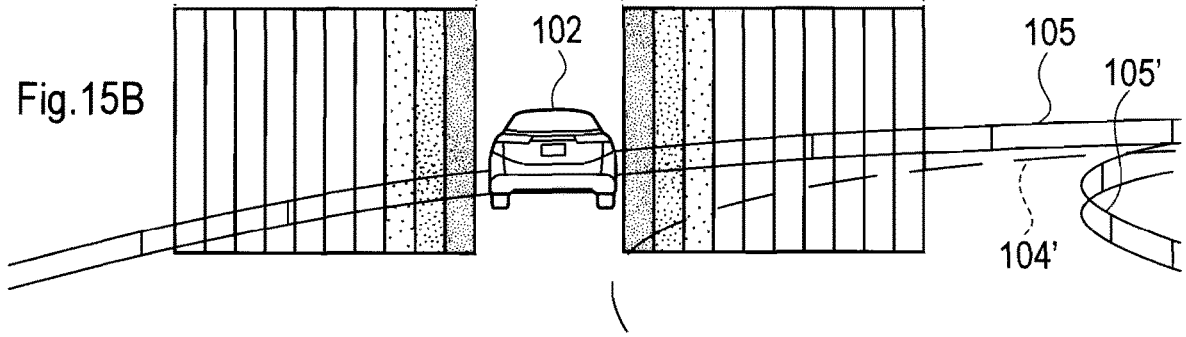

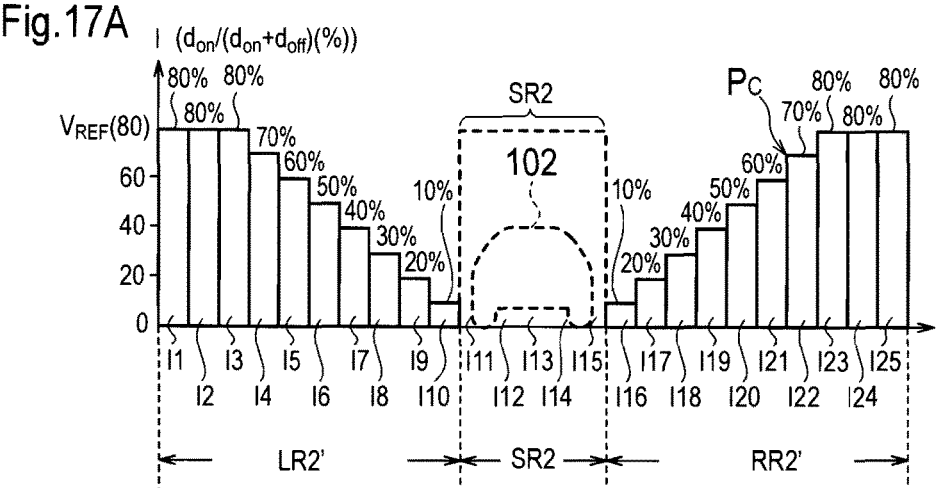
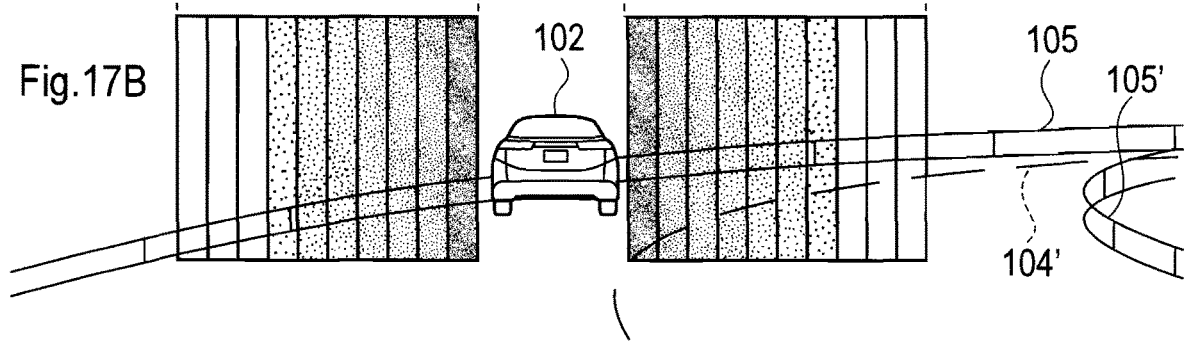

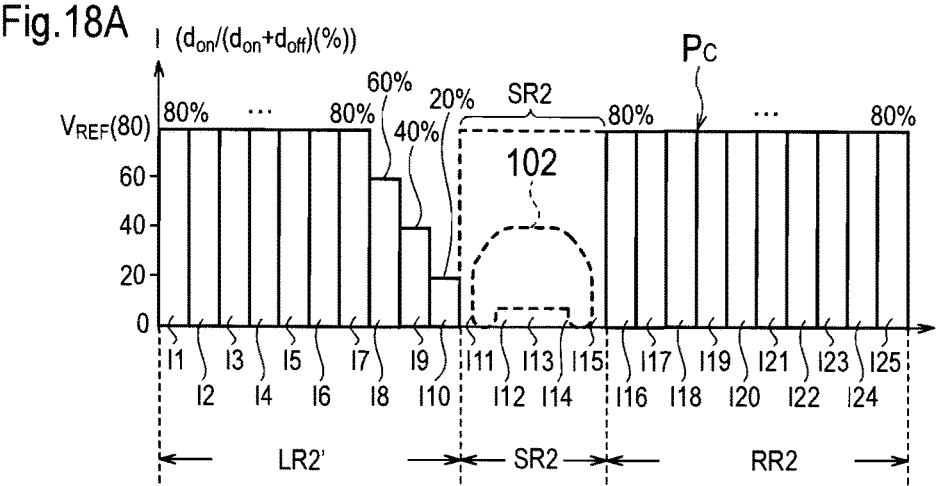
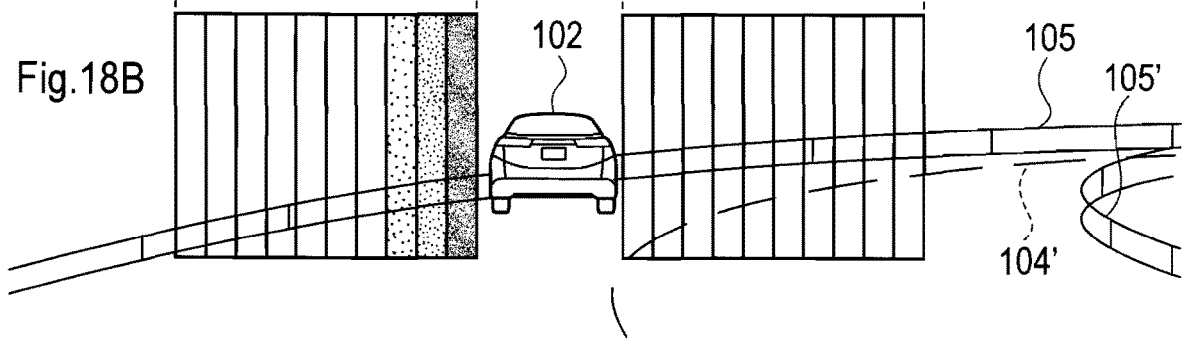

APPARATUS AND METHOD FOR CONTROLLING ADB-MODE VEHICLE HEADLAMP

This application claims the priority benefit under 35 U.S.C. § 119 to Japanese Patent Application No. JP2017-183569 filed on Sep. 25, 2017, which disclosure is hereby incorporated in its entirety by reference.

BACKGROUND

Field

The presently disclosed subject matter relates to an apparatus and method for controlling a vehicle headlamp in a high-beam mode.

Description of the Related Art

In a prior art vehicle headlamp controlling apparatus, light-emitting diode (LED) elements arranged equidistantly and horizontally in a row has been used as a vehicle headlamp for a high-beam mode. In this vehicle headlamp controlling apparatus, the LED elements are individually controlled in real time to realize an adaptive drive beam (ADB) (see: FIGS. 3 and 6 of JP2017-1620A & US2018/0170243A1).

In an ADB mode, when a preceding vehicle including an on-coming vehicle is detected by a camera or the like, only the LED elements aimed toward the preceding vehicle are turned off to decrease the illumination intensities aimed toward the preceding vehicle while a high-beam mode is maintained. As a result, glare aimed toward the preceding vehicle can be suppressed while the visibility in a high-beam mode can be maintained without affecting the preceding vehicle.

In FIG. 1, which illustrates a road at night for explaining an ADB mode, a subject vehicle 101 and a preceding vehicle 102 on one lane and an on-coming vehicle 103 on the other lane are travelling on a two-lane road 104 where a center line 104', guide rails 105 and 105' are provided. Also, sound shielding walls (not shown) may be provided as occasion demands. Further, if the road 104 is curved, reflectors are provided equidistantly on the outer side of the road 104. Each of the subject vehicle 101, the preceding vehicle 102 and the on-coming vehicle 103 has two headlamps and two taillamps.

Assume that the prior art vehicle headlamp controlling apparatus of the subject vehicle 101 includes twenty five LED elements arranged equidistantly and horizontally in a row for a headlamp in a high-beam mode.

Under the condition that the road 104 is straight, as illustrated in FIG. 2A, when the preceding vehicle 102 is recognized by the driver of the subject vehicle 101, the illumination intensities I11, I12, ..., I15 for the preceding vehicle 102 are decreased to zero and the illumination intensities I1, I2, ..., I10, I16, I17, ..., I25 are maintained at a reference intensity $I_{REF}$ for defining a standard illumination intensity. As a result, a light distribution received by the subject vehicle 101 is as illustrated in FIG. 2B. In FIG. 2B, a light shielding region SR1 is defined by the illumination intensities I11, I12, I13, I14 and I15 whose values are zero, while a left light distribution LR1 is affected by the illumination intensities I1, I2, ..., I10 which are $I_{REF}$, and a right light distribution RR1 is affected by the illumination intensities I16, I17, ..., I25 which are $I_{REF}$.

In FIG. 2B, highly reflective objects such as the guide rails 105 and 105', the sound shielding walls, the reflectors and so on are distant from the subject vehicle 101. Therefore, the left light distribution LR1 and the right light distribution RR1 are hardly affected by such highly reflective objects. However, the sides of the left light distribution LR1 and the right light distribution RR1 immediately adjacent to the light shielding region SR1 are a little dark. In FIG. 2B, note that "P" designates a pedestrian walking on a sidewalk along the guide rail 105 near the preceding vehicle 102.

On the other hand, under the condition that the road 104 is curved, as illustrated in FIG. 3A, when the preceding vehicle 102 is recognized by the driver of the subject vehicle 101, the illumination intensities I11, I12, ..., I15 aimed toward the preceding vehicle 102 are also decreased to zero and the illumination intensities I1, I2, ..., I10, I16, I17, ..., I25 are maintained at the reference intensity $I_{REF}$. As a result, a light distribution received by the subject vehicle 101 is illustrated in FIG. 3B. In FIG. 3B, a light shielding region SR2 is defined by the illumination intensities I11, I12, I13, I14 and I15 whose values are zero, while a left light distribution LR2 is affected by the illumination intensities I1, I2, ..., I10 which are $I_{REF}$, and a right light distribution RR2 is affected by the illumination intensities I16, I17, ..., I25 which are $I_{REF}$.

In FIG. 3B, highly reflective objects such as the guide rails 105 and 105', the sound shielding walls, the reflectors and so on are closer to the subject vehicle 101. Therefore, the left light distribution LR2 and the right light distribution RR2 are strongly affected by such highly reflective objects. As a result, the illumination intensities of the left light distribution LR2 and the right light distribution RR2 would be larger than those of the left light distribution LR1 and the right light distribution RR1, respectively, of FIG. 2B.

In FIG. 3B, however, the difference in illumination intensity between the light shielding region RS2 and the left light distribution LR2 (or the right light distribution RR2) is very large, which would make the driver of the subject vehicle 101 feel a sense of incongruity.

SUMMARY

The presently disclosed subject matter seeks to solve the above-described problems.

According to the presently disclosed subject matter, an apparatus for controlling an adaptive drive beam mode vehicle headlamp of a subject vehicle travelling a road includes: a headlamp driver adapted to drive the vehicle headlamp; a preceding vehicle determining section adapted to determine whether or not a preceding vehicle is travelling ahead of the subject vehicle; a road state determining section adapted to determine whether a state of the road is straight or curved, when it is determined that the preceding vehicle is travelling ahead of the subject vehicle; and a curved-mode illumination intensity pattern outputting section adapted to output a curved-mode illumination intensity pattern to the driver, when it is determined that the state of the road is curved. The curved-mode illumination intensity pattern has first illumination intensities aimed toward the preceding vehicle, the first illumination intensities being decreased to form a first light shielding region, and has second illumination intensities of areas adjacent to at least one side of the first light shielding region, the second illumination intensities being stepwise or continuously increased away from the first light shielding region to a reference value defining a standard illumination intensity.

Also, a method for controlling an adaptive drive beam mode vehicle headlamp of a subject vehicle travelling a road includes: determining whether or not a preceding vehicle is travelling ahead of the subject vehicle; determining whether a state of the road is straight or curved, when it is determined that the preceding vehicle is travelling ahead of the subject vehicle; and outputting a curved-mode illumination intensity pattern to a headlamp driver to drive the vehicle headlamp, when it is determined that the state of the road is curved. The curved-mode illumination intensity pattern has first illumination intensities aimed toward the preceding vehicle, the first illumination intensities being decreased to form a first light shielding region, and has second illumination intensities of areas adjacent to at least one side of the first light shielding region, the second illumination intensities being stepwise or continuously increased away from the first light shielding region to a reference value defining a standard illumination intensity.

According to the presently disclosed subject matter, since the difference in illumination intensity between the light shielding region and the areas adjacent thereto becomes small, the driver of the subject vehicle would not feel a sense of incongruity.

BRIEF DESCRIPTION OF THE DRAWINGS

The above and other advantages and features of the presently disclosed subject matter will be more apparent from the following description of certain embodiments, as compared with the prior art, taken in conjunction with the accompanying drawings, wherein:

FIG. 13 is a diagram illustrating an example of the normal-mode illumination intensity pattern at step 1202 of FIG. 12;

FIG. 15A is a diagram illustrating a first example of the curved-mode illumination intensity pattern at step 1206 of FIG. 12;

FIG. 15B is a diagram showing left and right light distributions adjacent to the light shielding region received by the subject vehicle from the curved-mode illumination intensity pattern of FIG. 15A;

FIG. 17A is a diagram illustrating a third example of the curved-mode illumination intensity pattern at step 1206 of FIG. 12;

FIG. 17B is a diagram showing left and right light distributions adjacent to the light shielding region received by the subject vehicle from the curved-mode illumination intensity pattern of FIG. 17A;

FIG. 18A is a diagram illustrating a fourth example of the curved-mode illumination intensity pattern at step 1206 of FIG. 12;

FIG. 18B is a diagram showing left and right light distributions adjacent to the light shielding region received by the subject vehicle from the curved-mode illumination intensity pattern of FIG. 18A;

DETAILED DESCRIPTION OF EXEMPLARY EMBODIMENTS

Figure 1:
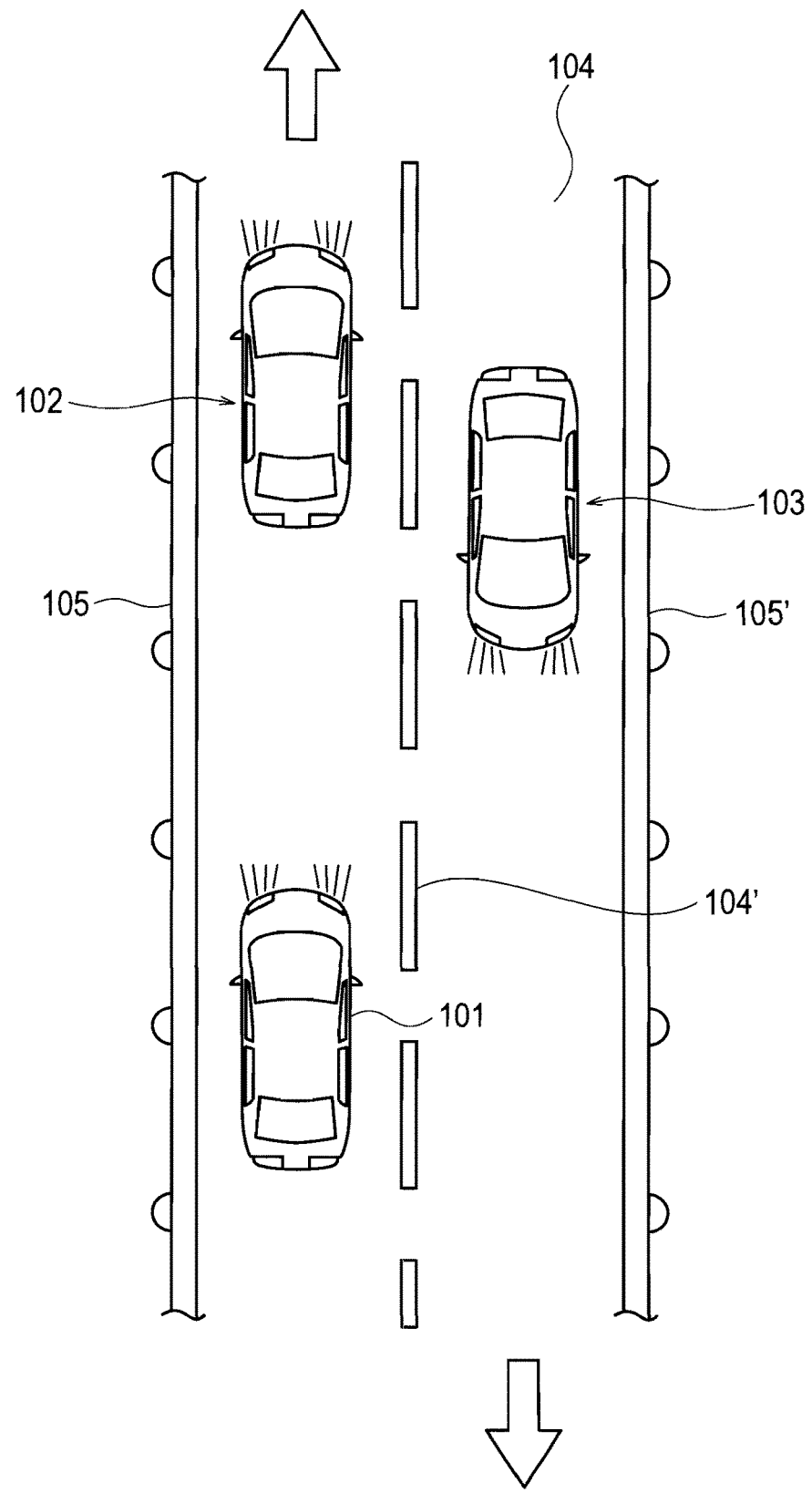
FIG. 1 is a view illustrating a road at night for explaining an ADB-mode.
Figure 4:
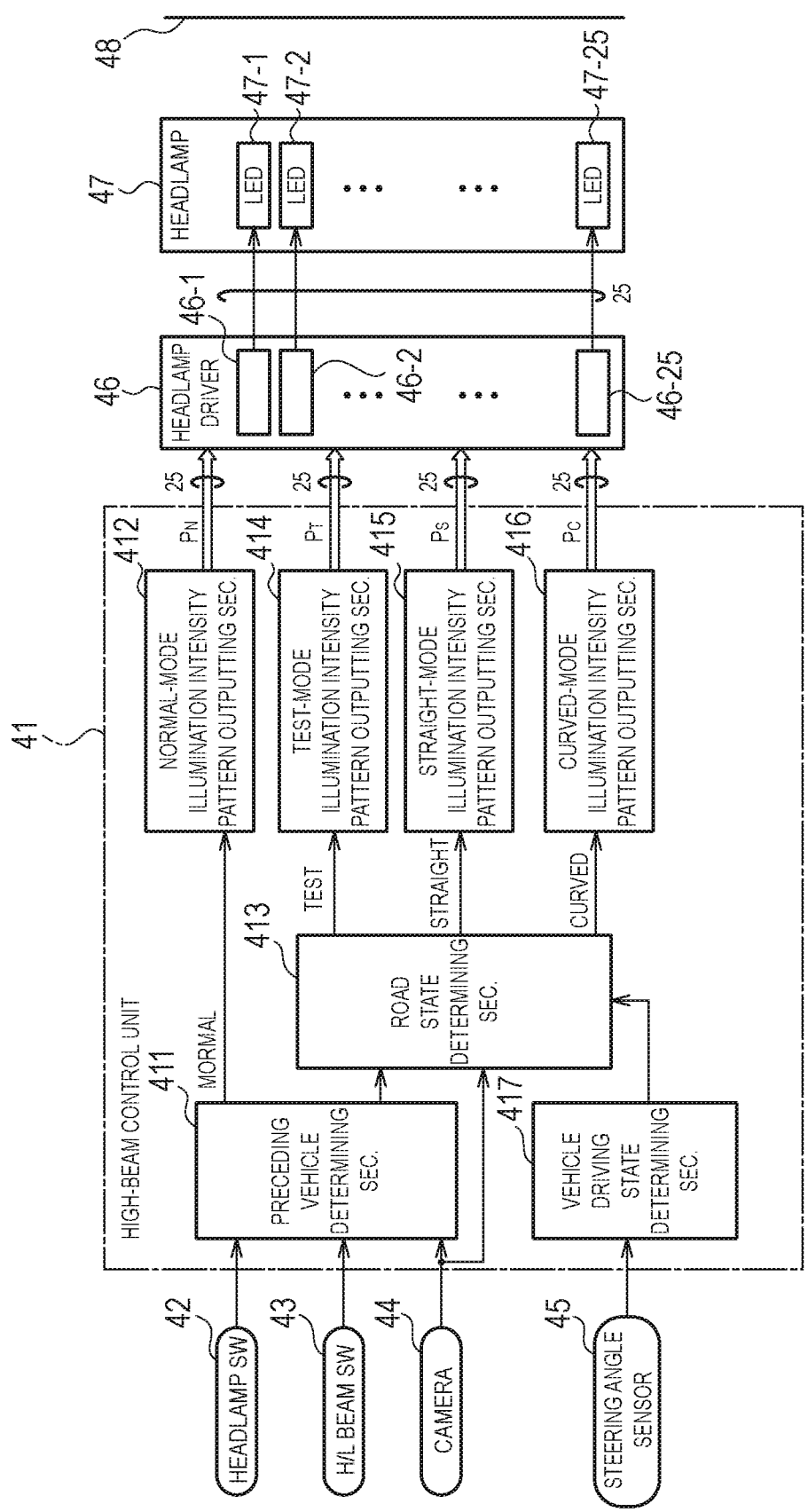
FIG. 4 is a block diagram illustrating an embodiment of the vehicle headlamp controlling apparatus according to the presently disclosed subject matter.

In FIG. 4, which is a block diagram illustrating an embodiment of the vehicle headlamp controlling apparatus according to the presently disclosed subject matter, a high-beam control unit 41 of the subject vehicle 101 (see FIG. 1) receives various sense signals from a headlamp switch 42, a high/low beam switch 43, a camera 43 mounted on a front portion of the subject vehicle 101 for taking pictures of the preceding vehicle 102 or the on-coming vehicle 103 (see FIG. 1) and a steering angle sensor 45 to control a headlamp driver 46 which drives a headlamp 47. Note that an imaginary vertical screen 48 is used for explaining the illumination intensities by the headlamp 47; however, the imaginary vertical screen 48 is actually absent.

The headlamp driver 46 is constructed by twenty five driver elements 46-1, 46-2, . . . , 46-25, each having the same configuration. Also, the headlamp 47, that is one of the two headlamps which have the same configuration as each other, is constructed by twenty five rectangular or square LED elements 47-1, 47-2, . . . , 47-25 which are driven by the driver elements 46-1, 46-2, . . . , 46-25, respectively. In this case, the LED elements 47-1, 47-2, . . . , 47-25 are equidistantly and horizontally arranged in a row.

Figure 5:
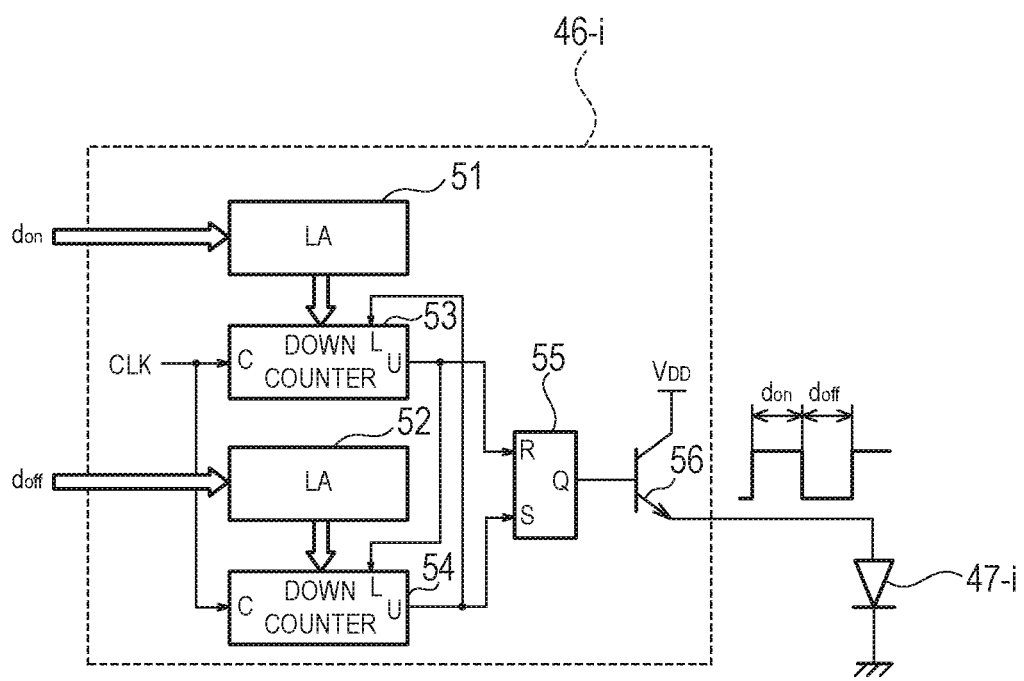
FIG. 5 is a detailed circuit diagram of the driver element of the headlamp driver of FIG. 4.

In FIG. 5, which is a block circuit diagram of the driver element 46-$i$ ($i$=1, 2, . . . , 25) of FIG. 4, the driver element 46-$i$ is constructed by a pulse width modulation (PWM) circuit which includes latch circuits 51 and 52, down counters 53 and 54, an RS-type flip-flop 55, and a transistor 56 such as a pnp-type bipolar transistor for driving the LED element 47-$i$. In the driver element 46-$i$, first, duty ratio values $d_{on}$ and $d_{off}$ are preset by the high-beam control unit 41 in the latch circuits 51 and 52, respectively. Then, a load signal (not shown) may be initially supplied to the load terminal L of the down counter 53, so that the on-duty value $d_{on}$ is loaded in the down counter 53. Then, the content of the down counter 53 is decremented by 1 in response to each pulse of a clock signal CLK. When the down counter 53 underflows to generate an underflow signal from its underflow terminal U, the RS-type flip-flop 55 is reset. Simultaneously, the underflow signal U of the down counter 53 is supplied as a load signal to the load terminal L of the down counter 54, so that the off-duty value $d_{off}$ is loaded in the down counter 54. Then, the content of the down counter 54 is decremented by 1 in response to each pulse of the clock signal CLK. When the down counter 54 underflows to generate an underflow signal from its underflow terminal U, the RS-type flip-flop 55 is set. Simultaneously, the underflow signal U of the down counter 53 is supplied as a load signal to the load terminal L of the down counter 53, so that the on-duty value $d_{on}$ is loaded in the down counter 53. Thus, the above-described operations are repeated to turn on and off the transistor 56 in accordance with the on-duty value $d_{on}$ and the off-duty value $d_{off}$, respectively, so that the LED element 47-$i$ is turned on and off in accordance with the on-duty value $d_{on}$ and the off-duty value $d_{off}$.

Figure 6A:
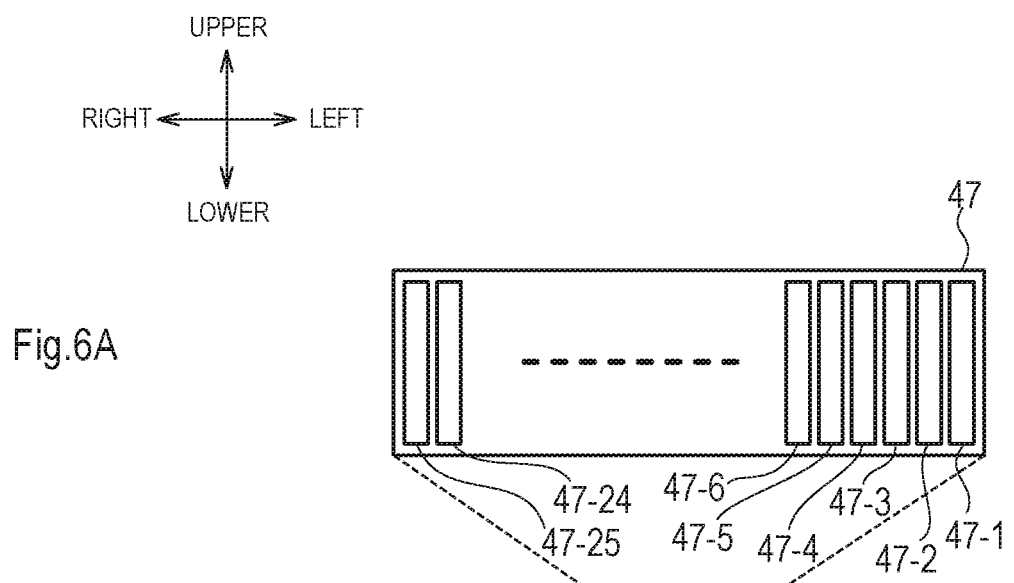
FIG. 6A is a front view of the headlamp of FIG. 4.
Figure 6B:
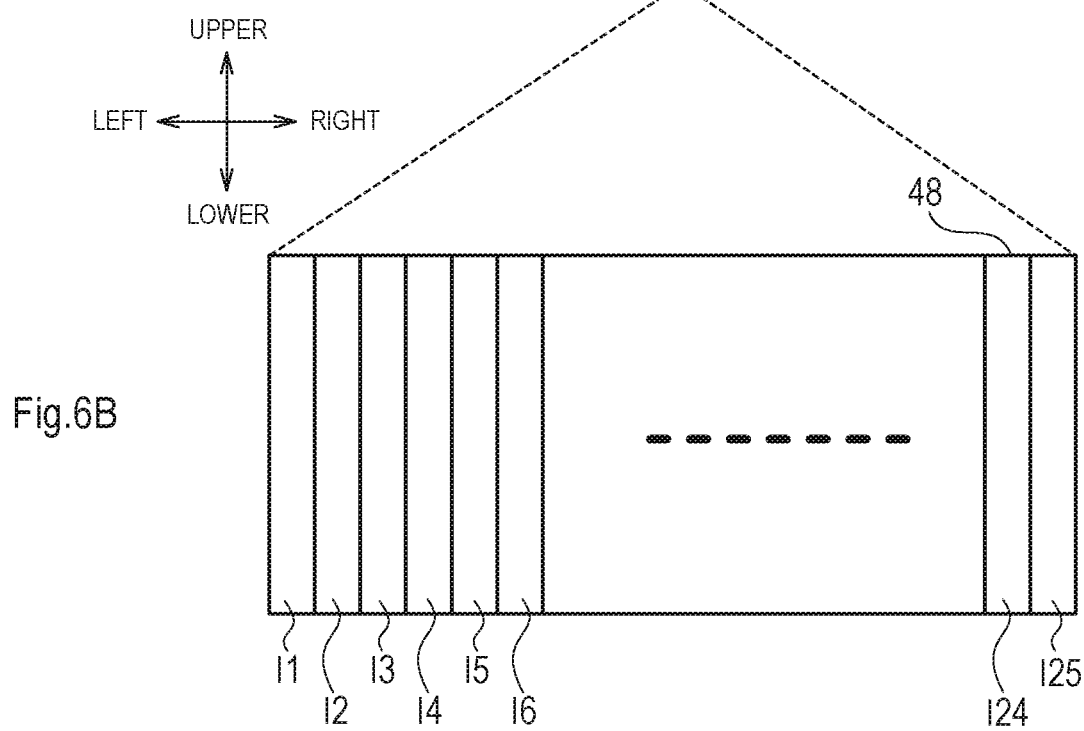
FIG. 6B is a front view of the imaginary vertical screen of FIG. 4.

FIG. 6A is a front view of the headlamp 47 of FIG. 4, and FIG. 6B is a front view of the imaginary vertical screen 48 of FIG. 4. In FIGS. 6A and 6B, the imaginary vertical screen 48 is lightened by the headlamp 47, so that the illumination intensities I1, I2, I3, I4, I5, . . . , I24 and I25 are realized by the LED elements 47-1, 47-2, 47-3, 47-4, 47-5, 47-6, . . . , 47-24 and 47-25 at the imaginary vertical screen 48 which is imaginarily partitioned into areas defined by their illumination intensities I1, I2, I3, I4, I5, I6, . . . , I24 and I25 in accordance with the LED elements 47-1, 47-2, 47-3, 47-4, 47-5, 47-6, . . . , 47-24 and 47-25, respectively. In this case, in view of the driver of the subject vehicle 101, the sequence of the LED elements 47-1, 47-2, 47-3, 47-4, 47-5, 47-6 . . . , 47-24 and 47-25 is opposite to that of the areas of the imaginary vertical screen 48 indicated by the illumination intensities I1, I2, I3, I4, I5, I6, . . . , I24 and I25.

Returning to FIG. 4, the high-beam control unit 41 is constructed by a preceding vehicle determining section 411, a normal-mode illumination intensity pattern outputting section 412, a road state determining section 413 for determining whether the state of the road 104 is straight or curved, a test-mode illumination intensity pattern outputting section 414, a straight-mode illumination intensity pattern outputting section 415, a curved-mode illumination intensity pattern outputting section 416 and a vehicle driving state determining section 417 for determining the driving state of the subject vehicle 101 is straight or curved in accordance with the steering angle SA of the steering angle sensor 45.

In a high-beam mode, the preceding vehicle determining section 411 determines whether or not a preceding vehicle (see "102" in FIG. 1) including an on-coming vehicle (see "103" in FIG. 1) is travelling ahead of the subject vehicle 101 in accordance with the output signals of the headlamp switch 42, the high/low beam switch 43 and the camera 44. When no preceding vehicle is travelling ahead of the subject vehicle 101, the normal-mode illumination intensity pattern outputting section 412 outputs a normal-mode illumination intensity pattern $P_N$ and transmits it to the headlamp driver 46. The normal-mode illumination intensity pattern $P_N$ will be explained later.

When a preceding vehicle 102 or an on-coming vehicle 103 is travelling ahead of the subject vehicle 101, the road state determining section 413 determines whether a road 104 (see FIG. 1) on which the subject vehicle 101 is travelling is straight or curved. When the road 104 is straight, the straight-mode illumination intensity pattern outputting section 415 outputs a straight-mode illumination intensity pattern $P_s$ and transmits it to the headlamp driver 46. The straight-mode illumination intensity pattern $P_s$ will be explained later. On the other hand, when the road 104 is curved, the curved-mode illumination intensity pattern outputting section 416 outputs a curved-mode illumination intensity pattern $P_C$ and transmits it to the headlamp driver 46. The curved-mode illumination intensity pattern $P_C$ will be explained later.

The determination of the road state by the road state determining section 413 is cancelled by the driving state of the subject vehicle 101 determined by the vehicle driving state determining section 417, which will be explained in detail later.

The high-beam control unit 41 of FIG. 4 is constructed by a microcomputer including a central processing unit (CPU), a read-only memory (ROM) for storing programs, constants and so on, a random access memory (RAM) for storing temporary data, and the like.

The operation of the high-beam control unit 41 using the microcomputer is explained in detail below.

Figure 7:
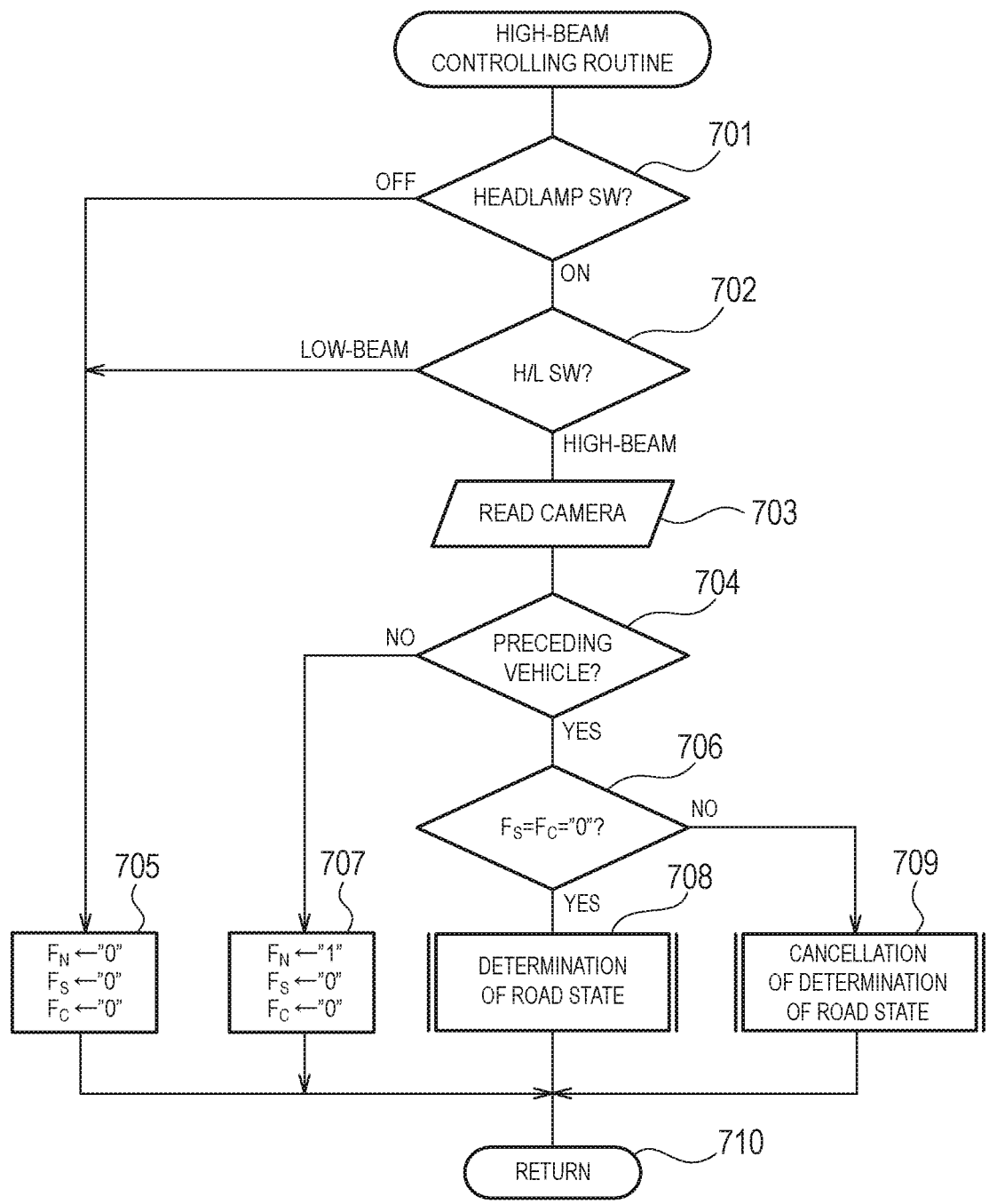
FIG. 7 is a flowchart for explaining an operation of the high-beam control unit of FIG. 4.

A high-beam controlling routine as illustrated in FIG. 7 is executed at time period such as 4 ms.

In the routine of FIG. 7, the following flags $F_N$, $F_S$ and $F_C$ are defined by $F_N$: execution of the normal-mode illumination intensity pattern $P_N$;

$F_S$: execution of the straight-mode illumination intensity pattern $P_S$; and $F_C$: execution of the curved-mode illumination intensity pattern $P_C$.

First, at step 701, it is determined whether or not the headlamp switch 42 is being turned on, and at step 702, it is determined whether the high/low beam switch 43 is in a high beam mode or in a low-beam mode. Only when it is determined at step 701 that the headlamp switch 42 is being turned on and it is determined at step 702 that the high/low beam switch 43 is in a high-beam mode, does the control proceed to steps 703 and 704. Otherwise, the control proceeds to step 705 which resets the flags $F_N$, $F_S$ and $F_C$ ($F_N$=$F_S$=$F_C$="0"), thus returning to step 710.

At step 703, image data is fetched from the camera 44, and at step 704, it is determined whether a preceding vehicle 102 (or an on-coming vehicle) is travelling ahead of the subject vehicle 101 using the image data of the camera 44. For example, the preceding vehicle 102 can be detected by the image of its taillamps in the image data, and the on-coming vehicle 102 can be detected by the image of its headlamps in the image data. Note that if the preceding vehicle 102 (or the on-coming vehicle 103) is a two-wheeled vehicle, such a two-wheeled vehicle can be detected by its one taillamp (or one headlamp). Only when it is determined at step 704 that the preceding vehicle 102 (or the on-coming vehicle 103) is travelling ahead of the subject vehicle 101, does the control to step 706. Otherwise, the control proceeds to step 707 which sets the flag $F_N$ "1") and resets the flag $F_S$ and $F_C$ (="0"), thus returning to step 710.

At steps 703 and 704, if a radar unit is provided in a front portion of the subject vehicle 101, the data of the radar unit can be used instead of the image data of the camera 44.

At step 706, it is determined whether or not $F_S=F_C=$"0", i. e., the determination of a road state on which the subject vehicle 101 is travelling has already been carried out. When it is determined at step 706 that the road state determination has not been carried out ($F_S=F_C=$"0"), the control proceeds to step 708, while when it is determined at step 706 that the road state determination has been carried out ($F_S=$"1" or $F_C=$"1"), the control proceeds to step 709.

Figure 3:
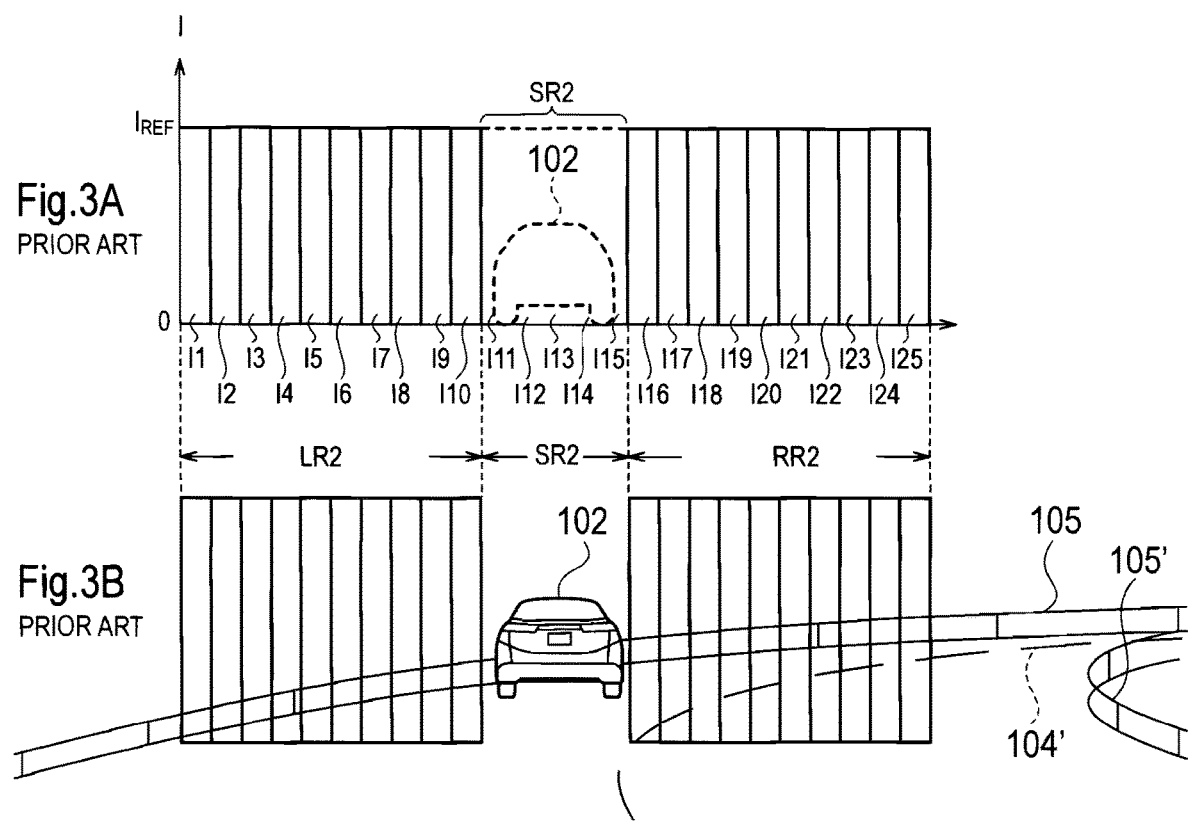
FIG. 3A is a graph showing ADB-mode illumination intensity characteristics of the prior art vehicle headlamp controlling apparatus on a curved road.
FIG. 3B is a diagram showing a light distribution received by the subject vehicle due to the ADB-mode illumination intensity characteristics of the prior art vehicle headlamp controlling apparatus of FIG. 3A.

The road state determining step 708 of FIG. 7 is now explained in detail with reference to FIG. 8. Note that the road state determining step 708 corresponds to the operation of the road state determining section 413 of FIG. 3.

Figure 2:
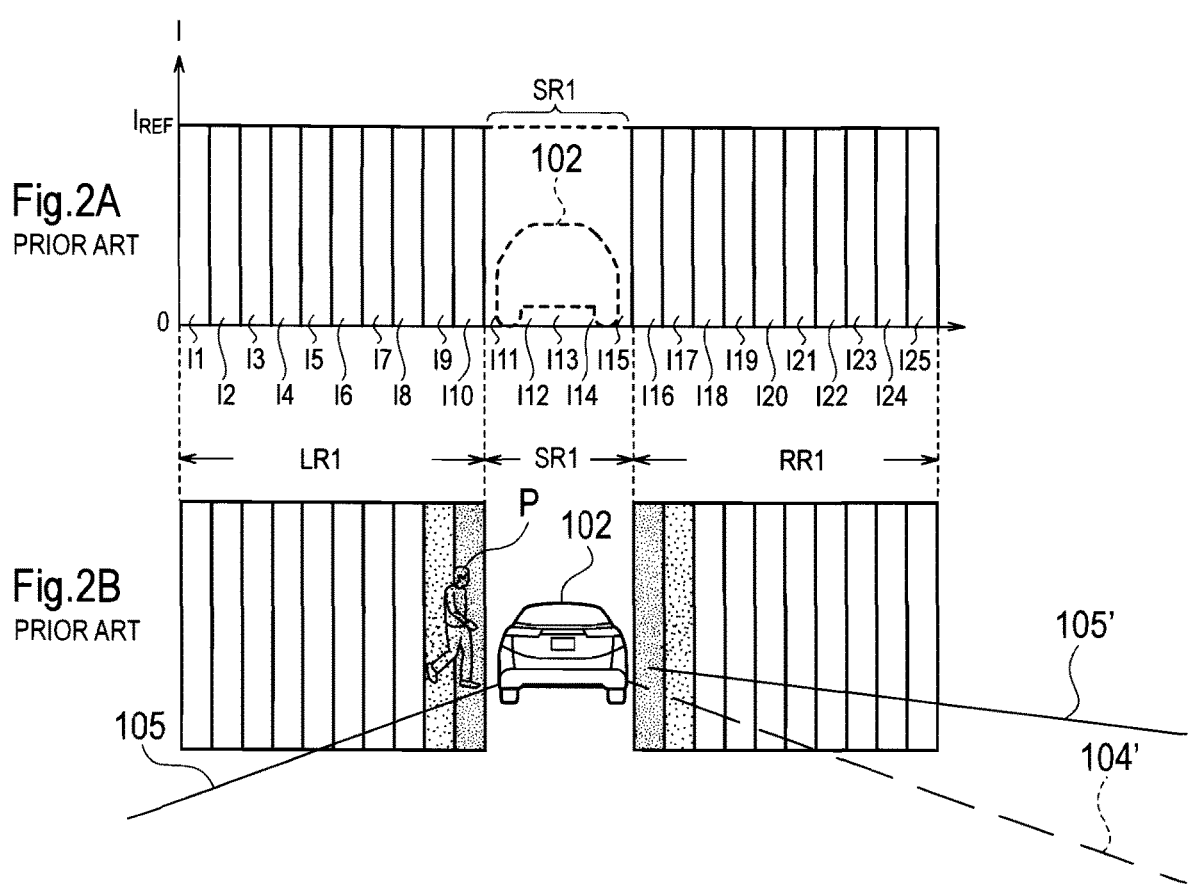
FIG. 2A is a graph showing ADB-mode illumination intensity characteristics of a prior art vehicle headlamp controlling apparatus on a straight road.
FIG. 2B is a diagram showing a light distribution received by the subject vehicle due to the ADB-mode illumination intensity characteristics of the prior art vehicle headlamp controlling apparatus of FIG. 2A.
Figure 9:
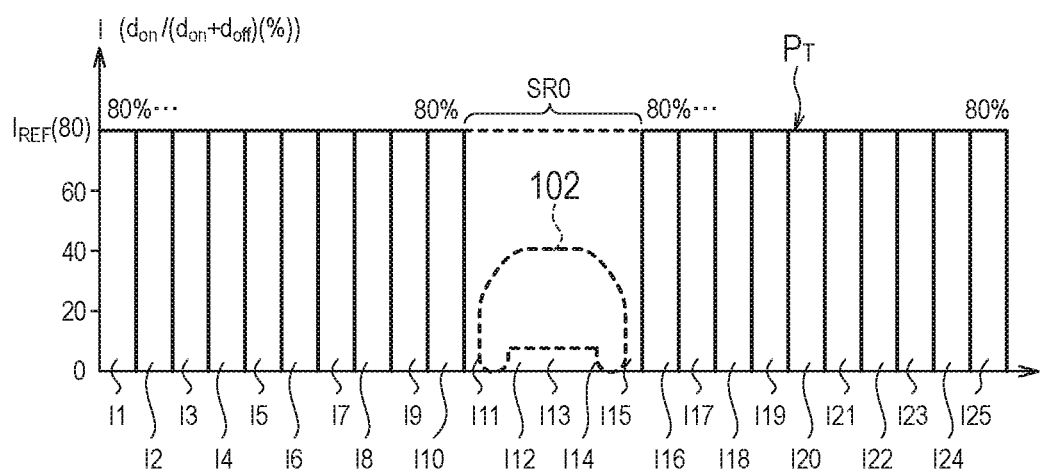
FIG. 9 is a diagram illustrating an example of the test-mode illumination pattern at step 801 of FIG. 8.

First, at step 801, the CPU generates a test-mode illumination intensity pattern $P_T$ and transmits it to the headlamp driver 46. The test-mode illumination intensity pattern $P_T$ is illustrated in FIG. 9 where the illumination intensities I11, I12, I13, I14 and I15 aimed toward the preceding vehicle 102 determined at step 704 of FIG. 7 are decreased to zero to define a light shielding region SR0 and the other illumination intensities I1, I2, . . . , I10, I16, . . . , I25 are at the reference value $V_{REF}$ which is defined by $d_{on}/(d_{on}+d_{off})=$ 80%. Note that the test-mode illumination intensity pattern $P_T$ is similar to the illumination intensity pattern as illustrated in FIG. 2A or 3A.

Next, at step 802, image data of the camera 44 is fetched.

Next, at step 803, it is determined whether or not the illumination intensity Ir of reflected light from an area immediately adjacent to the light shielding region SR0 using the image data of the camera 44 fetched at step 802 is smaller than a predetermined threshold value TH. In this case, the area is either on a left side or on a right side of the light shielding region SR0. As a result, when the illumination intensity Ir of the reflected light is smaller than the threshold value TH, it is determined that the state of the road 104 is straight, so that the control proceeds to step 804 which sets the straight-mode intensity pattern flag $F_S$ ($F_S=$"1"). On the other hand, when the illumination intensity Ir of the reflected light is not smaller than the threshold value TH, it is determined that the state of the road 104 is curved, so that the control proceeds to step 805 which sets the curved-mode intensity pattern flag $F_C$ ($F_C=$"1"). Then, the control returns to step 710 of FIG. 7

The road state determination cancelling step 709 of FIG. 7 is now explained in detail with reference to FIG. 10. Note that the road state determination cancelling step 709 corresponds to the operation of the vehicle state driving determining section 417 of FIG. 4.

First, at step 1001, the CPU fetches a steering angle SA from the steering angle sensor 45. That is, the steering angle SA is input, and an analog/digital (A/D) conversion is performed upon the steering angle SA.

Next, at step 1002, it is determined whether or not SA>α (definite value) is satisfied. That is, a vehicle driving state can be determined by the steering angle SA. Therefore, when SA>α, it is determined that the vehicle driving state is a straight driving state, so that the road straight state is returned to a non-straight road state. Thus, the control proceeds to step 1003 which resets the straight-mode illumination intensity pattern flag $F_s$ ($F_s=$"0"). On the other hand, when SA≤α, it is determined that the vehicle driving state is a driving curved state, so that the road curved state is returned to a non-curved road state. Thus, the control proceeds to step 1004 which resets the curved-mode illumination intensity pattern flag $F_c$ ($F_c=$"0").

Then the control returns to step 710 of FIG. 7.

Note that data of a gyro sensor or car navigation data can be used instead of the output signal of the steering angle sensor 45.

Figure 8:
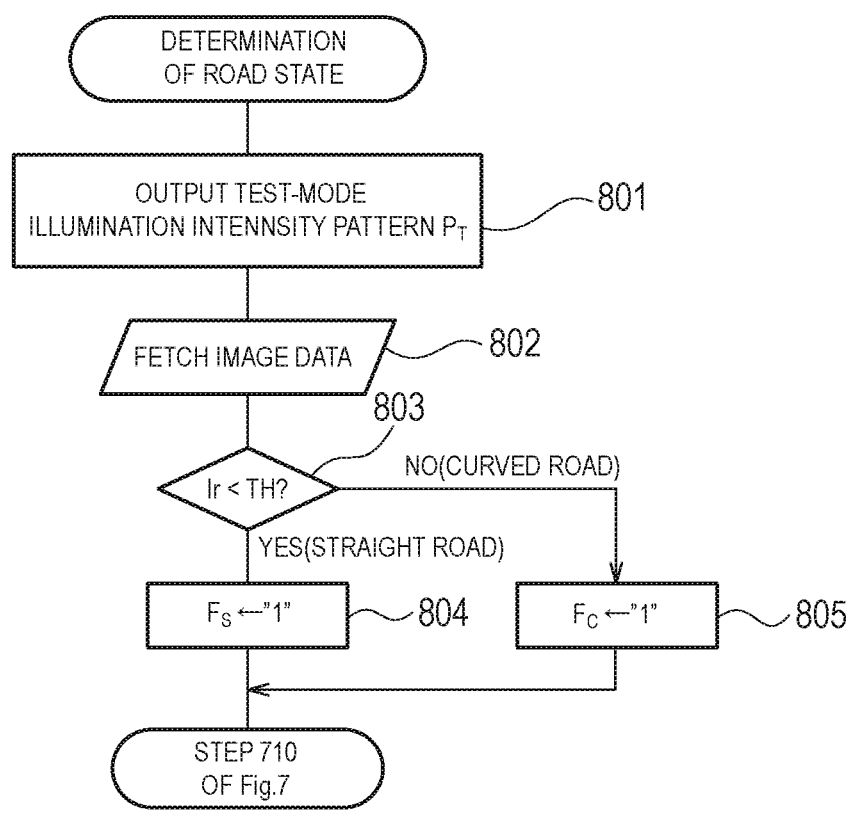
FIG. 8 is a detailed flowchart of the road state determining step 708 of FIG. 7.
Figure 10:
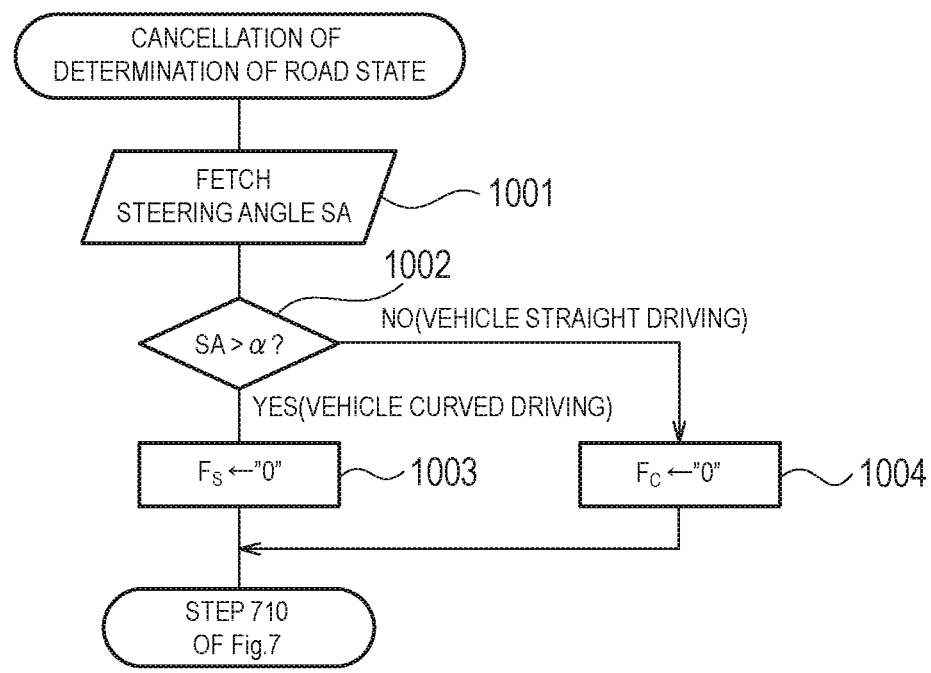
FIG. 10 is a detailed flowchart of the road state determination cancelling step 709 of FIG. 7.
Figure 11A:
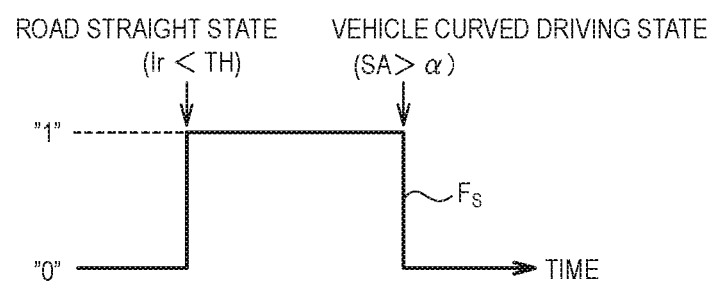
FIG. 11A is a timing diagram of the straight-mode illumination intensity pattern flag $F_s$ controlled by the routines of FIGS. 7, 8 and 10.

The straight-mode illumination intensity pattern flag $F_s$ controlled by the routines of FIGS. 7, 8 and 10 is shown in FIG. 11A. That is, the straight-mode illumination intensity pattern flag $F_s$ is set ($F_s=$"1") at a timing when the reflected illumination intensity $I_r$ satisfies $I_r$<TH realizing a road straight state, and is reset ($F_s=$"0") at a timing when the steering angle SA satisfies SA>α realizing a vehicle curved driving state. Of course, if the preceding vehicle 102 including the on-coming vehicle 103 is lost, the straight-mode illumination intensity pattern flag $F_s$ is reset ($F_s=$"0") by step 707 of FIG. 7.

Figure 11B:
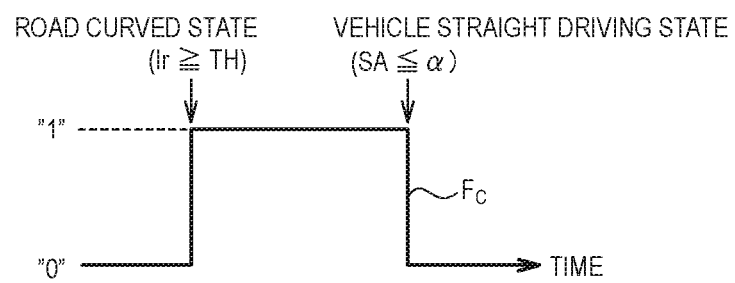
FIG. 11B is a timing diagram of the curved-mode illumination intensity pattern flag $F_c$ controlled by the routines of FIGS. 7, 8 and 10.

The curved-mode illumination intensity pattern flag $F_c$ controlled by the routines of FIGS. 7, 8 and 10 is shown in FIG. 11B. That is, the curved-mode illumination intensity pattern flag $F_c$ is set ($F_s=$"1") at a timing when the reflected illumination intensity $I_r$ satisfies $I_r$≥TH realizing a road curved state, and is reset ($F_c=$"0") at a timing when the steering angle SA satisfies SA≤α realizing a vehicle straight driving state. Of course, if the preceding vehicle 102 including the on-coming vehicle 103 is lost, the curved-mode illumination intensity pattern flag $F_c$ is reset ($F_c=$"0") by step 707 of FIG. 7.

Figure 12:
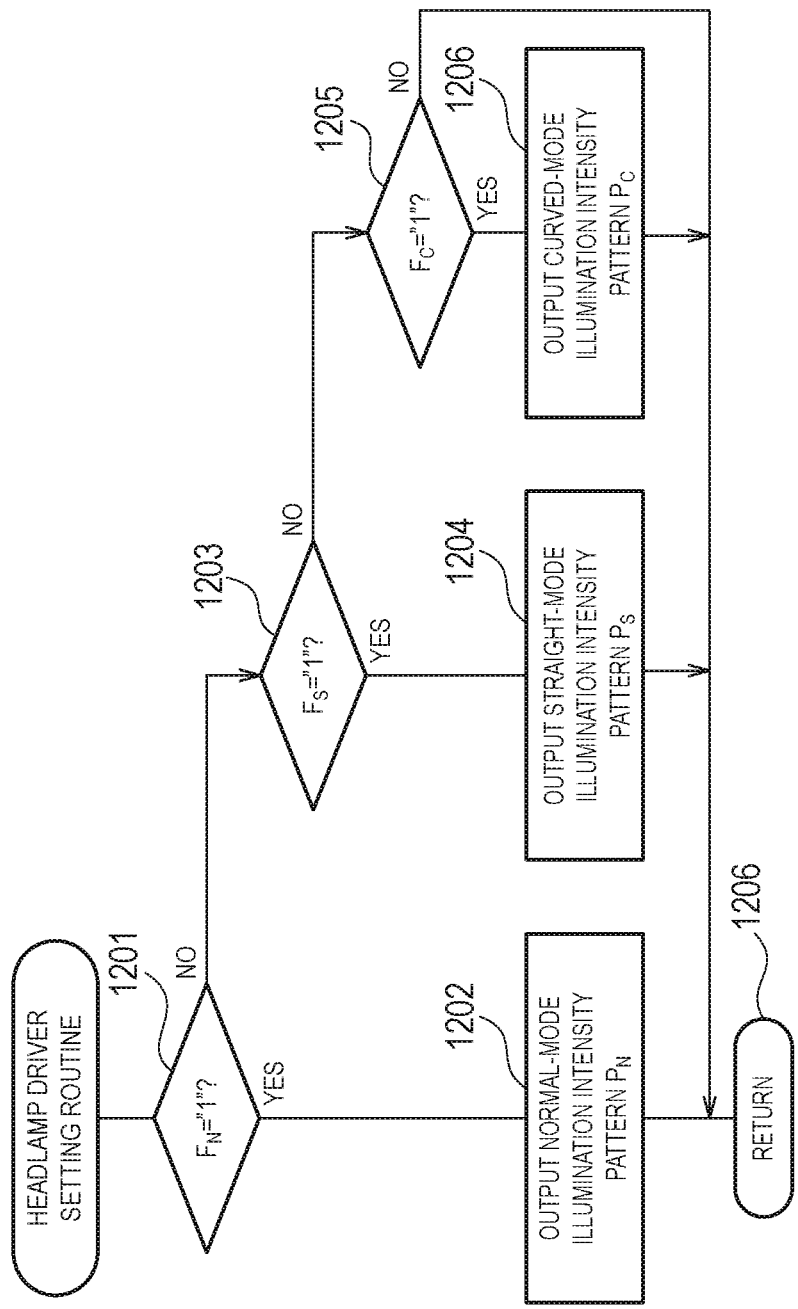
FIG. 12 is a flowchart for explaining a headlamp driver setting operation of the high-beam control unit of FIG. 4.

A headlamp driver setting routine as illustrated in FIG. 12 is also executed at time period such as 4 ms.

First, at step 1201, it is determined whether or not the normal illumination intensity pattern flag $F_N$ satisfies $F_N=$"1". Only when $F_N=$"1", does the control proceed to step 1202 which generates a normal-mode illumination intensity pattern $P_T$ as illustrated in FIG. 13. Otherwise, the control proceeds to step 1203.

In FIG. 13, all the illumination intensities I1, I2, . . . , I25 are at the reference value $I_{REF}$ which is defined by $d_{on}/(d_{on}+d_{off})=$80%. Then, the control proceeds to step 1206.

Figure 14A:
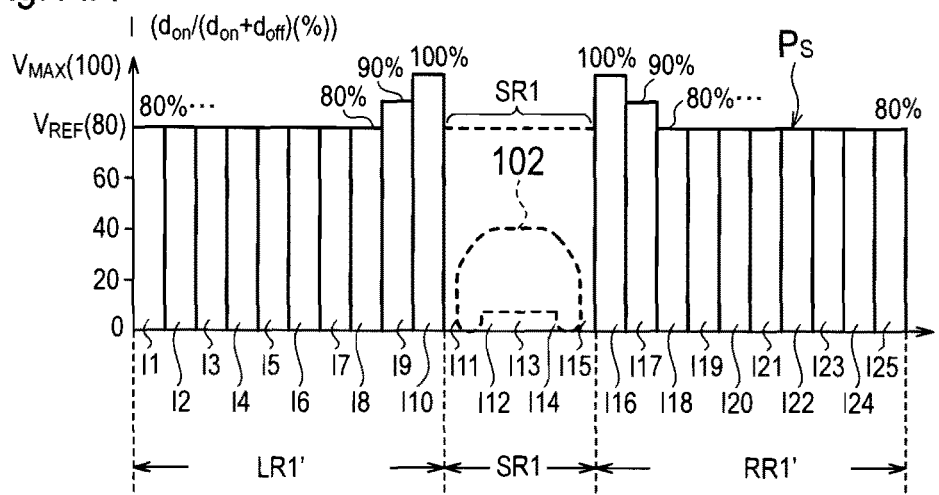
FIG. 14A is a diagram illustrating an example of the straight-mode illumination intensity pattern at step 1204 of FIG. 12.

At step 1203, it is determined whether or not the straight-mode illumination intensity pattern flag $F_s$ satisfies $F_s=$"1". Only when $F_s=$"1", does the control proceed to step 1204 which generates a straight-mode illumination intensity pattern $P_s$ as illustrated in FIG. 14A. Otherwise, the control proceeds to step 1205.

Figure 14B:
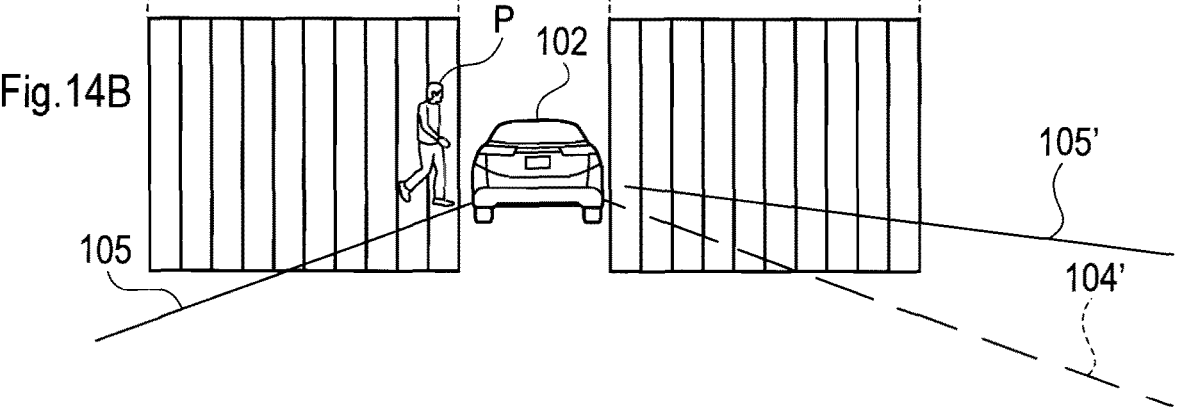
FIG. 14B is a diagram showing left and right light distributions adjacent to the light shielding region received by the subject vehicle from the straight-mode illumination intensity pattern of FIG. 14A.

In FIG. 14A, the illumination intensities I11, I12, I13, I14 and I15 for the preceding vehicle 102 are decreased to zero to create the light shielding region SR1, while the illumination intensities I1, I2, . . . , I8, I18, I19, . . . , I25 are maintained at the reference value $I_{REF}$ ($d_{on}/(d_{on}+d_{off})=$80%). Also, the illumination intensities I9, I10, I16 and I17 of the areas adjacent to the light shielding region SR1 are larger than the reference value $I_{REF}$. For example, the illumination intensities I9 and I17 are caused to be a value defined by $d_{on}/(d_{on}+d_{off})$=90%, and the illumination intensities I10 and I16 are caused to be a maximum value $V_{MAX}$ defined by $d_{on}/(d_{on}+d_{off})$=100%. As a result, as illustrated in FIG. 14B, a left light distribution LR1' received by the subject vehicle 101 is affected by the strong illumination intensities I9 and I10, and a right light distribution RR1' received by the subject vehicle 101 is affected by the strong illumination intensities I16 and I17. Thus, the pedestrian P walking on the sidewalk along the guide rail 105 near the preceding vehicle 102 can easily be recognized by the driver of the subject vehicle 101. Then, the control proceeds to step 1206.

At step 1205, it is determined whether or not the curved-mode illumination intensity pattern flag $F_c$ satisfies $F_c$="1". Only when $F_c$="1", does the control proceed to step 1206 which generates a curved-mode illumination intensity pattern $P_c$ as illustrated in FIG. 15A. Otherwise, the control proceeds to step 1206.

In FIG. 15A, the illumination intensities I11, I12, I13, I14 and I15 for the preceding vehicle 102 are decreased to zero to create the light shielding region SR2, while the illumination intensities I1, I2, . . . , I7, I9, I20, . . . , I25 are maintained at the reference value $I_{REF}$ ($d_{on}/(d_{on}+d_{off})$=80%). Also, the illumination intensities I8, I9, I10, I16, I17 and I18 of the areas adjacent to the light shielding region SR2 are smaller than the reference value $I_{REF}$. For example, the illumination intensities I8 and I18 are caused to be a value defined by $d_{on}/(d_{on}+d_{off})$=60%, the illumination intensities I9 and I17 are caused to be a value defined by $d_{on}/(d_{on}+d_{off})$=40%, and the illumination intensities I10 and I16 are caused to be a value defined by $d_{on}/(d_{on}+d_{off})$=20%. That is, the illumination intensities I11, I10, I9, I8, I7 are stepwise changed, i.e., increased from zero to the reference value $V_{REF}$, and the illumination intensities I15, I16, I17, I18 and I19 are stepwise changed, i.e., increased from zero to the reference value $V_{REF}$. As a result, as illustrated in FIG. 15B, the difference in illumination intensity between the light shielding region RS2 and a left light distribution LR2' received by the subject vehicle 101 becomes very small, and also, the difference in illumination intensity between the light shielding region RS2 and a right light distribution RR2' received by the subject vehicle 101 becomes very small. Therefore, the driver of the subject vehicle 101 would not feel a sense of incongruity. Then, the control proceeds to step 1206.

Figure 16A:
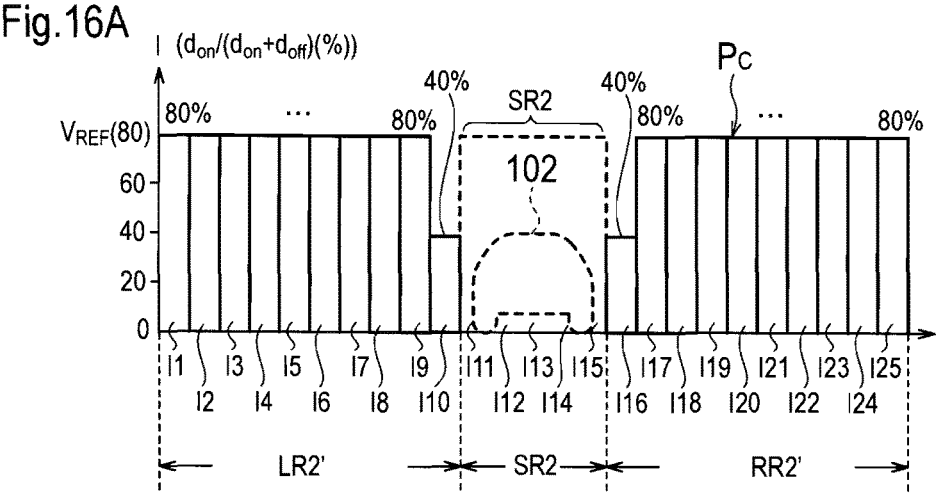
FIG. 16A is a diagram illustrating a second example of the curved-mode illumination intensity pattern at step 1206 of FIG. 12.
Figure 16B:
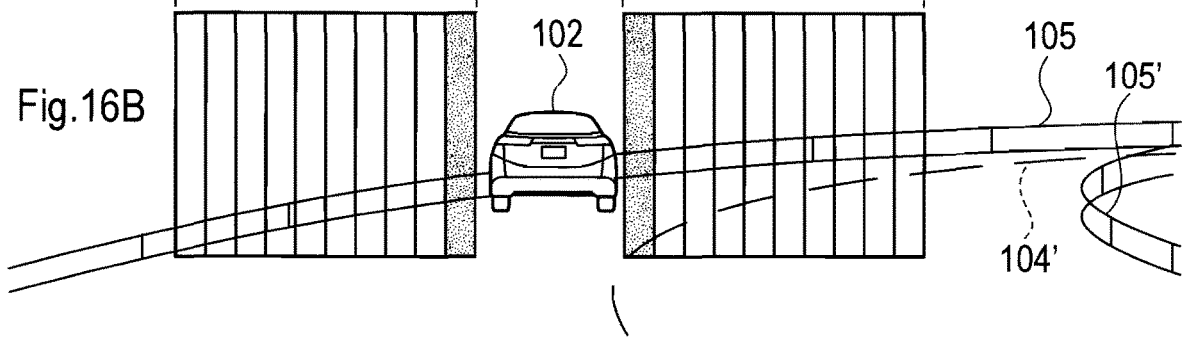
FIG. 16B is a diagram showing left and right light distributions adjacent to the light shielding region received by the subject vehicle from the curved-mode illumination intensity pattern of FIG. 16A.

In FIG. 16A, which illustrates another example of the curved-mode illumination intensity pattern $P_c$ at step 1206 of FIG. 12, the illumination intensities I1, I2, . . . , I9, I17, I18, . . . , I25 are maintained at the reference value $I_{REF}$ ($d_{on}/(d_{on}+d_{off})$=80%). Also, the illumination intensities I10 and I16 of the areas adjacent to the light shielding region SR2 are smaller than the reference value $I_{REF}$. For example, the illumination intensities I10 and I16 are caused to be a value defined by $d_{on}/(d_{on}+d_{off})$=40%. That is, the illumination intensities I11, I10 and I9 are stepwise changed, i.e., increased from zero to the reference value $V_{REF}$, and the illumination intensities I15, I16 and I17 are stepwise changed, i. e., increased from zero to the reference value $V_{REF}$. As a result, as illustrated in FIG. 16B, the difference in illumination intensity between the light shielding region RS2 and a left light distribution LR2' received by the subject vehicle 101 becomes very small, and also, the difference in illumination intensity between the light shielding region RS2 and a right light distribution RR2' received by the subject vehicle 101 becomes very small. Therefore, the driver of the subject vehicle 101 would not feel a sense of incongruity.

In FIG. 17A, which illustrates still another example of the curved-mode illumination intensity pattern $P_c$ at step 1206 of FIG. 12, the illumination intensities I11, I12, I13, I14 and I15 for the preceding vehicle 102 are decreased to zero to create the light shielding region SR2, while the illumination intensities I1, I2, I3, I23, I24 and I25 are maintained at the reference value $I_{REF}$ ($d_{on}/(d_{on}+d_{off})$=80%). Also, the illumination intensities I4, I5, I6, I7, I8, I9, I10, I16, I17, I18, I19, I20, I21 and I22 of the areas adjacent to the light shielding region SR2 are smaller than the reference value $I_{REF}$. In this case, the illumination intensities I11, I10, I9 . . . , and I3 are stepwise changed, i. e., increased from zero to $d_{on}/(d_{on}+d_{off})$= 80% ($V_{REF}$), and the illumination intensities I15, I16, I17, . . . , I23 are stepwise changed, i. e., increased from zero to $d_{on}/(d_{on}+d_{off})$=80% ($V_{REF}$). As a result, as illustrated in FIG. 17B, the difference in illumination intensity between the light shielding region RS2 and a left light distribution LR2' received by the subject vehicle 101 becomes very small, and also, the difference in illumination intensity between the light shielding region RS2 and a right light distribution RR2' received by the subject vehicle 101 becomes very small. Therefore, the driver of the subject vehicle 101 would not feel a sense of incongruity. Then, the control proceeds to step 1206.

In FIGS. 15A, 16A and 17A, the stepwise-changed illumination intensities I1, I2, . . . , I25 are symmetrical with respect to the light shielding region RS2; however, the stepwise-changed illumination intensities I1, I2, . . . , I25 can be asymmetrical with respect to the light shielding region RS2. Particularly, in order not to move the subject vehicle 101 beyond the center line 104, as illustrated in FIGS. 18A and 18B, the illumination intensities I16, I17, . . . , I25 of the right light distribution RR2 are not decreased to lighten the center line 104. In FIGS. 18A and 18B, assume that the road follows the keep-to-the-left rule; however, under the keep-to-the-left rule, the illumination intensities I1, I2, . . . , I10 of the left light distribution are not decreased.

Figure 19A:
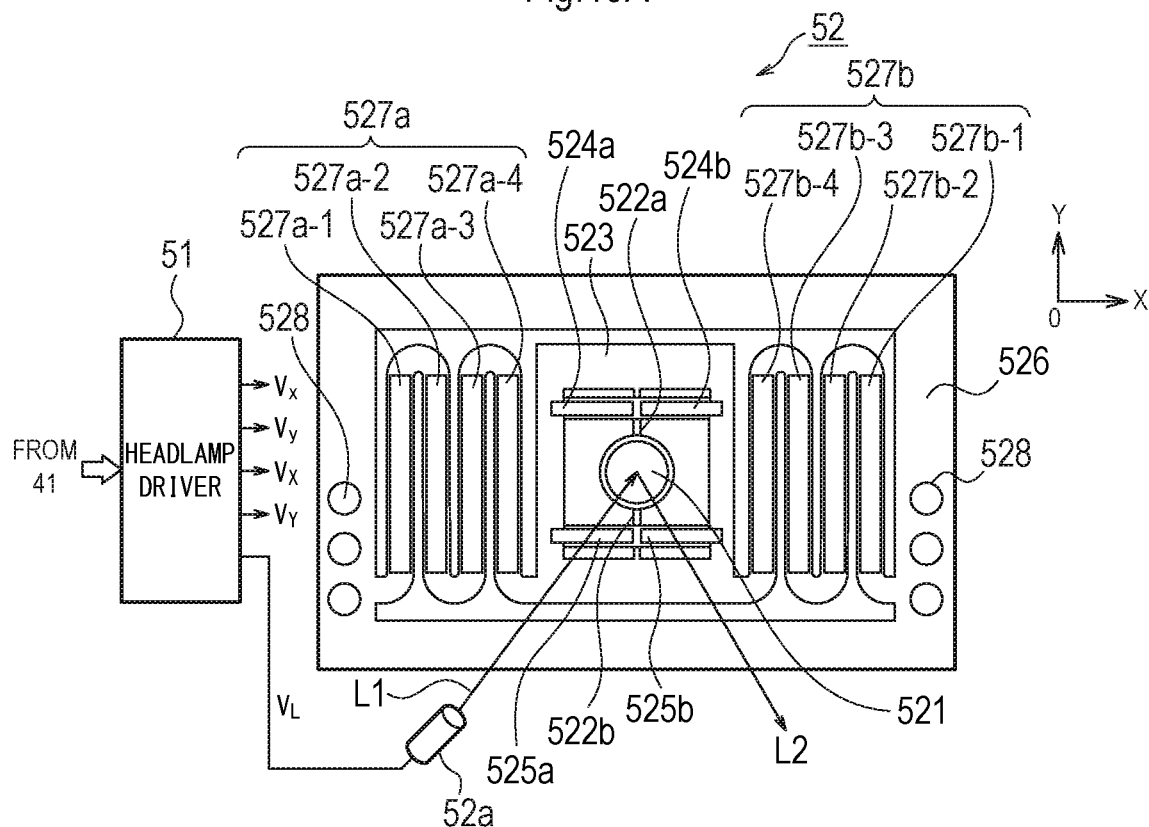
FIG. 19A is a front view of the two-dimensional optical deflector used as the headlamp of FIG. 4.

The headlamp driver 46 and the headlamp 47 using the LED elements 47-1, 47-2, . . . , 47-25 of FIG. 4 can be replaced by a headlamp driver 51 and a headlamp using a two-dimensional optical deflector 52 manufactured by a micro electro mechanical system (MEMS) associated with a laser light source 52a, as illustrated in FIG. 19A. Regarding the two-dimensional optical deflector, reference is made to JP2015-102785A.

The optical deflector 52 is constructed by a circular mirror 521 for reflecting incident light L1 from the laser light source 52a, a pair of torsion bars 522a and 522b coupled to the mirror 521 along a Y-axis, a rectangular inner frame (movable support frame) 523 surrounding the mirror 521 and the torsion bars 522a and 522b for supporting the mirror 521, a pair of inner piezoelectric actuators 524a and 524b coupled between the torsion bar 522a and inner coupling portions of the inner frame 523, and a pair of inner piezoelectric actuator 525a and 525b coupled between the torsion bar 522b and inner coupling portions of the inner frame 523. In this case, the flexing direction of the inner piezoelectric actuator 524a (525a) is opposite to that of the inner piezoelectric actuator 524b (525b), so that the inner piezoelectric actuators 524a (525a) and 524b (525b) serve as cantilevers for rocking the mirror 521 around the Y-axis.

Also, the optical deflector 52 includes an outer frame (fixed support frame) 526 and a pair of meander-type outer piezoelectric actuators 527a and 527b coupled between coupling portions of the outer frame 526 and outer coupling portions of the inner frame 523 and serving as cantilevers for rocking the mirror 521 around an X-axis on the plane of the mirror 521 centered at the center of the mirror 521. The outer piezoelectric actuators 527a and 527b are arranged opposite to each other with respect to the mirror 521.

The outer frame 526 is rectangular-framed to surround the inner frame 523 associated with the meander-type outer piezoelectric actuators 527a and 527b. The meander-type outer piezoelectric actuator 527a is constructed by piezoelectric cantilevers 527a-1, 527a-2, 527a-3 and 527a-4 which are serially-coupled from the coupling portion of the outer frame 526 to the coupling portion of the inner frame 523. Similarly, the meander-type outer piezoelectric actuator 527b is constructed by piezoelectric cantilevers 527b-1, 527b-2, 527b-3 and 527b-4 which are serially-coupled from the coupling portion of the outer frame 526 to the outer coupling portion of the inner frame 523.

Provided on the outer frame 526 are pads 528 which are connected to the headlamp driver 51. The headlamp driver 51 applies a drive voltage $V_{Y1}$ to the inner piezoelectric actuators 525a and 526a applies a drive voltage $V_{Y2}$ to the inner piezoelectric actuators 525b and 525b. The drive voltages $V_{Y1}$ and $V_{Y2}$ are sinusoidal, and the drive voltage $V_{Y1}$ is opposite in phase to the drive voltage $V_{Y2}$. For example, the frequency $f_Y$ of the drive voltages $V_{Y1}$ and $V_{Y2}$ is one resonant frequency $f_r$ such as 25 kHz depending upon a resonant structure formed by the mirror 521, the torsion bars 522a and 522b and the inner piezoelectric actuators 524a, 524b, 525a and 525b. Thus, the mirror 521 is rocked around the Y-axis. On the other hand, the headlamp driver 51 applies a drive voltage $V_{X1}$ to the odd-numbered piezoelectric cantilevers 527a-1, 527a-3, 527b-1 and 527b-3, and applies a drive voltage $V_{X2}$ to the even-numbered piezoelectric cantilevers 527a-2, 527a-4, 527b-2 and 527b-4. The drive voltages $V_{X1}$ and $V_{X2}$ are saw-tooth-shaped, and the drive voltage $V_{X1}$ is opposite in phase to the drive voltage $V_{X2}$. For example, the frequency $f_X$ of the drive voltages $V_{X1}$ and $V_{X2}$ is 60 Hz, much lower than the resonant frequency $f_r$. Thus, the mirror 521 is rocked around the X-axis.

Figure 19B:
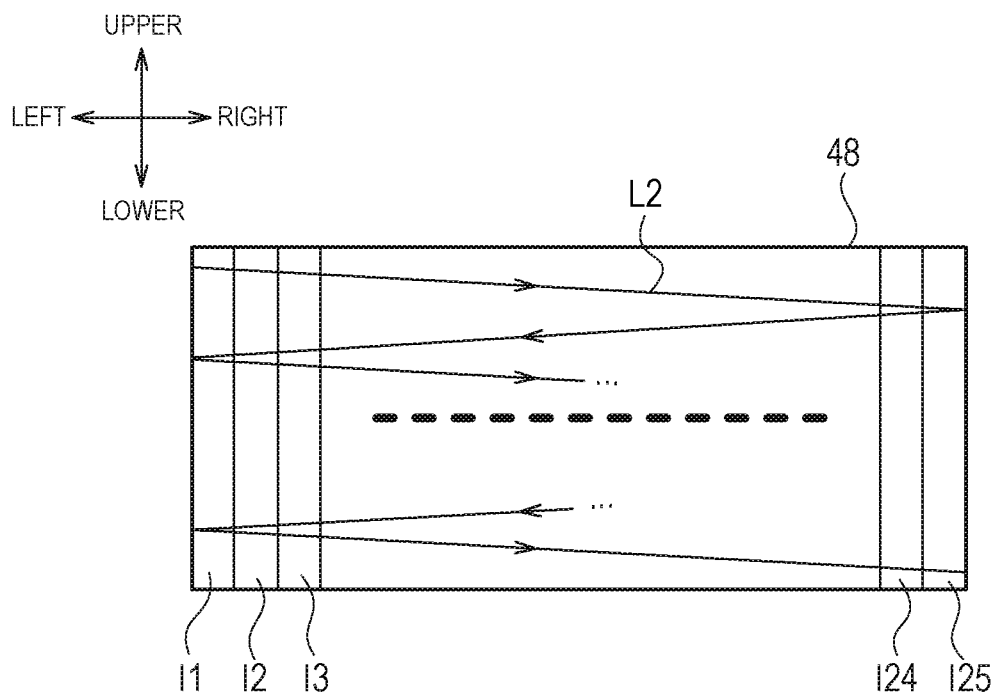
FIG. 19B is a front view of the imaginary vertical screen of FIG. 4 when the two-dimensional optical deflector of FIG. 19A is used as the headlamp of FIG. 4.
Figure 20:
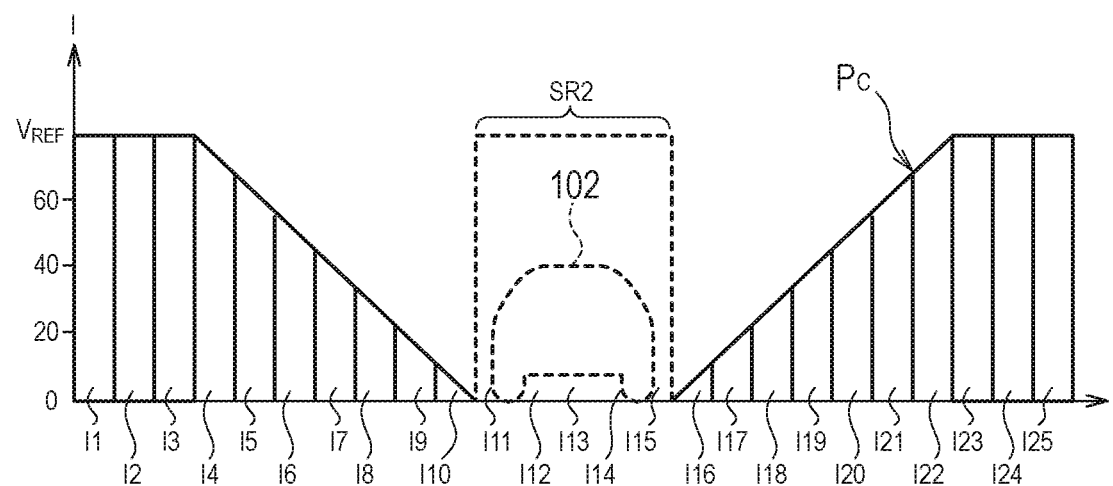
FIG. 20 is a diagram illustrating a fourth example of the curved-mode illumination intensity pattern by the two-dimensional optical deflector of FIG. 19A.

The laser light L1 of the laser light source 49a is controlled by a voltage $V_L$ of the headlamp driver 51, so that the imaginary vertical screen 48 is scanned with reflected light L2 by the mirror 521 as illustrated in FIG. 19B. In this case, the laser light source 52a is continuously driven by the headlamp driver 51 controlled by the high-beam control unit 41 of FIG. 4. Thus, examples of continuously-changed illumination intensities I1, I2, . . . , I25 as shown in FIG. 20 can be realized. Note that FIG. 20 corresponds to FIG. 17A.

Also, the two-dimensional optical deflector 52 of FIG. 19A can be replaced by a two-dimensional optical deflector using digital micromirror devices (DMDs).

Figure 21:
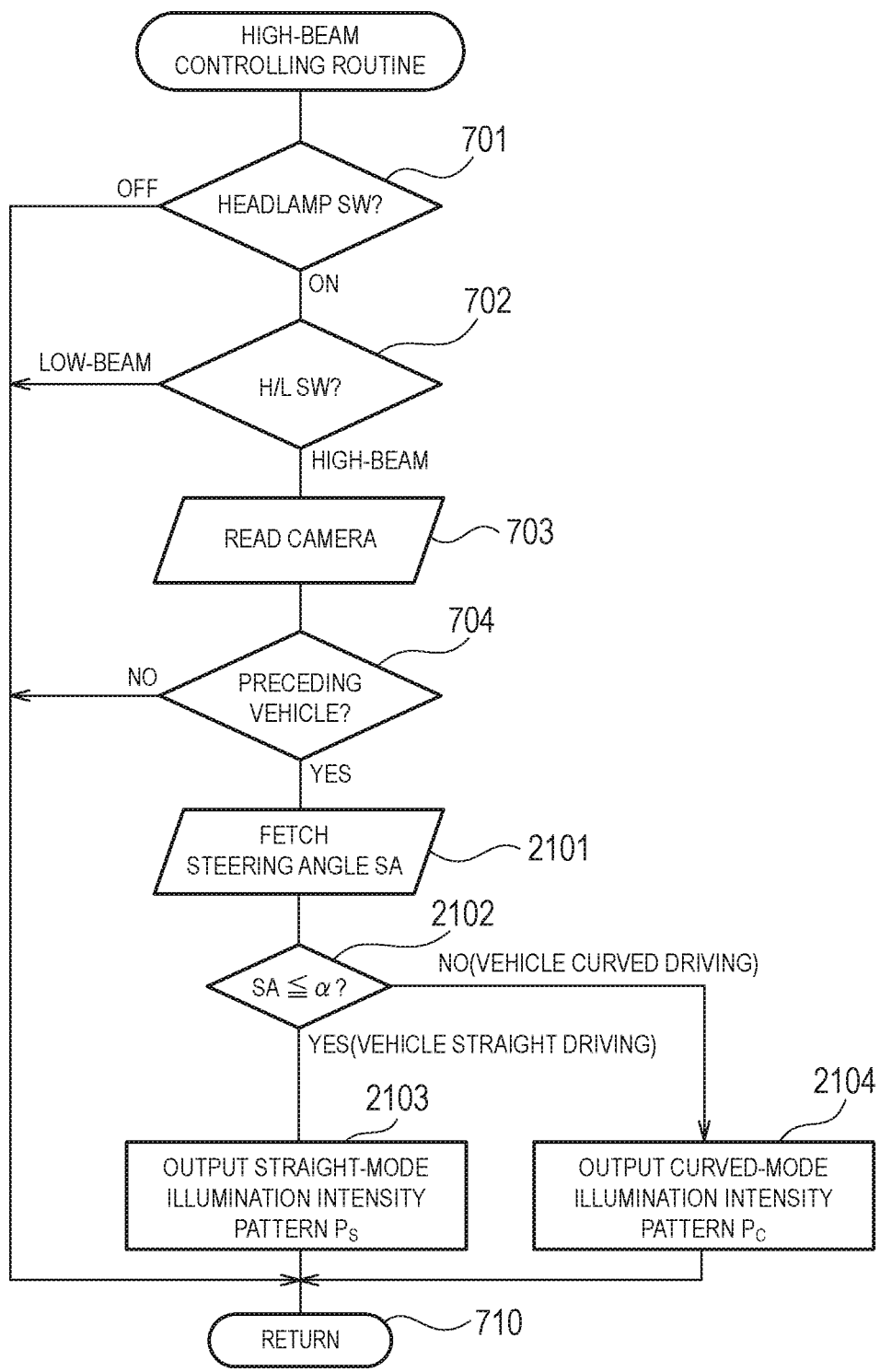
FIG. 21 is a flowchart for explaining another headlamp driver setting operation of the high-beam control unit of FIG. 4.

In FIG. 21, which is a flowchart for explaining another headlamp driver setting operation of the high-beam control unit 41 of FIG. 4, steps 705, 706, 707, 708 and 709 of FIG. 7 are replaced by steps 2101, 2102, 2103 and 2104.

In FIG. 21, only when it is determined at step 704 that the preceding vehicle 102 (or the on-coming vehicle 103) is travelling ahead of the subject vehicle 101, does the control to steps 2101 through 2104.

At step 2101, the CPU fetches a steering angle SA from the steering angle sensor 45. That is, the steering angle SA is input, and an analog/digital (A/D) conversion is performed upon the steering angle SA.

Next, at step 2102, it is determined whether or not SA≤α (definite value) is satisfied. That is, a vehicle driving state can be determined by the steering angle SA. Therefore, when SA≤α, it is determined that the vehicle driving state is a straight driving state, so that the control proceeds to step 2103 which generates a straight-mode illumination intensity pattern $P_s$ as illustrated in FIG. 14A. On the other hand, when SA>α, it is determined that the vehicle driving state is a driving curved state, so that the control proceeds to step 2104 which generates a curved-mode illumination intensity pattern $P_c$ as illustrated in FIG. 15A.

Then the control returns to step 710.

Note that data of a gyro sensor or car navigation data can be used instead of the output signal of the steering angle sensor 45.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An apparatus for controlling an adaptive drive beam mode vehicle headlamp of a subject vehicle travelling a road, comprising:
    a headlamp driver adapted to drive said vehicle headlamp;
    a preceding vehicle determining section adapted to determine whether or not a preceding vehicle is travelling ahead of said subject vehicle;
    a road state determining section adapted to determine whether a state of said road is straight or curved, when it is determined that said preceding vehicle is travelling ahead of said subject vehicle; and
    a curved-mode illumination intensity pattern outputting section adapted to output a curved-mode illumination intensity pattern to said headlamp driver, when it is determined that the state of said road is curved,
    said curved-mode illumination intensity pattern having first illumination intensities aimed toward said preceding vehicle, said first illumination intensities being decreased to zero to form a first light shielding region for said preceding vehicle, and having second illumination intensities of areas adjacent to both sides of said first light shielding region, said second illumination intensities being stepwise or continuously increased away from said first light shielding region from zero to a reference value smaller than a maximum value defined by said vehicle headlamp.

2. The apparatus as set forth in claim 1, further comprising a test-mode illumination intensity pattern outputting section adapted to output a test-mode illumination intensity pattern to said headlamp driver,
    said test-mode illumination intensity pattern having third illumination intensities aimed toward said preceding vehicle, said third illumination intensities being decreased to zero to form a second light shielding region, and having fourth illumination intensities of areas adjacent to said light shielding region, said fourth illumination intensities being said reference value,
    said road state determining section being adapted:
    to operate said test-mode illumination intensity pattern outputting section to output said test-mode illumination intensity pattern to said headlamp driver;
    to determine whether or not an illumination intensity of one of the areas immediately adjacent to said second light shielding region received by said subject vehicle is smaller than a threshold value;

to determine that the state of said road is straight, when the illumination intensity of the one of the areas immediately adjacent to said second light shielding region received by said subject vehicle is smaller than said threshold value; and to determine that the state of said road is curved, when the illumination intensity of the one of the areas immediately adjacent to said second light shielding region received by said subject vehicle is not smaller than said threshold value.

3. The apparatus as set forth in claim 1, further comprising a vehicle driving state determining section adapted to determine whether a driving state of said subject vehicle is straight or curved, said vehicle driving state determining section being adapted to cancel determination by said road state determining section that the state of said road is straight, when it is determined that the state of said vehicle is curved, said vehicle driving state determining section being adapted to cancel determination by said road state determining section that the state of said road is curved, when it is determined that the state of said subject vehicle is straight.

4. The apparatus as set forth in claim 1, wherein said second illumination intensities are symmetrical with respect to said first light shielding region.

5. The apparatus as set forth in claim 1, wherein said second illumination intensities are asymmetrical with respect to said first light shielding region.

6. The apparatus as set forth in claim 1, further comprising a straight-mode illumination intensity pattern outputting section adapted to output a straight-mode illumination intensity pattern to said headlamp driver, when it is determined that the state of said road is straight, said straight-mode illumination intensity pattern having fifth illumination intensities aimed toward said preceding vehicle, said fifth illumination intensities being decreased to zero to form a third light shielding region, and having sixth illumination intensities of areas adjacent to said third light shielding region, said sixth illumination intensities immediately close to said third light shielding region being larger than said reference value, said sixth illumination intensities apart from said third light shielding region to approach said reference value.

7. An apparatus for controlling an adaptive drive beam mode vehicle headlamp of a subject vehicle travelling a road, comprising:

a headlamp driver adapted to drive said vehicle headlamp;

a preceding vehicle determining section adapted to determine whether or not a preceding vehicle is travelling ahead of said subject vehicle;

a vehicle driving state determining section adapted to determine whether a driving state of said subject vehicle is straight or curved, when it is determined that said preceding vehicle is travelling ahead of said subject vehicle; and a curved-mode illumination intensity pattern outputting section adapted to output a curved-mode illumination intensity pattern to said headlamp driver, when it is determined that the state of said subject vehicle is curved, said curved-mode illumination intensity pattern having first illumination intensities aimed toward said preceding vehicle, said first illumination intensities being decreased to zero to form a first light shielding region for said preceding vehicle, and having second illumination intensities of areas adjacent to both sides of said first light shielding region, said second illumination intensities being stepwise or continuously increased away from said first light shielding region from zero to a reference value smaller than a maximum value defined by said vehicle headlamp.

8. The apparatus as set forth in claim 6, wherein said sixth illumination intensities are symmetrical with respect to said third light shielding region.

9. The apparatus as set forth in claim 7, further comprising a straight-mode illumination intensity pattern outputting section adapted to output a straight-mode illumination intensity pattern to said headlamp driver, when it is determined that the state of said subject vehicle is straight, said straight-mode illumination intensity pattern having fifth illumination intensities aimed toward said preceding vehicle, said fifth illumination intensities being decreased to form a third light shielding region, and having sixth illumination intensities of areas adjacent to said fifth light shielding region, said sixth illumination intensities immediately close to said third light shielding region being larger than said reference value.

10. The apparatus as set forth in claim 7, wherein said vehicle driving state determining section is adapted to operate in accordance with one of steering angle data, gyro sensor data and car navigation data.

11. A method for controlling an adaptive drive beam mode vehicle headlamp of a subject vehicle travelling a road, comprising:

determining whether or not a preceding vehicle is travelling ahead of said subject vehicle;

determining whether a state of said road is straight or curved, when it is determined that said preceding vehicle is travelling ahead of said subject vehicle; and outputting a curved-mode illumination intensity pattern to a headlamp driver to drive said vehicle headlamp, when it is determined that the state of said road is curved, said curved-mode illumination intensity pattern having first illumination intensities aimed toward said preceding vehicle, said first illumination intensities being decreased to zero to form a first light shielding region for said preceding vehicle, and having second illumination intensities of areas adjacent to both sides of said first light shielding region, said second illumination intensities being stepwise or continuously increased away from said first light shielding region from zero to a reference value smaller than a maximum value defined by said vehicle headlamp.

12. The method as set forth in claim 11, further comprising outputting a test-mode illumination intensity pattern to said driver, said test-mode illumination intensity pattern having third illumination intensities aimed toward said preceding vehicle, said third illumination intensities being decreased to form a second light shielding region, and having fourth illumination intensities of areas adjacent to said light shielding region, said fourth illumination intensities being said reference value, said road state determining comprising:

operating said test-mode illumination intensity pattern outputting section to output said test-mode illumination intensity pattern to said headlamp driver;

determining whether or not an illumination intensity of one of the areas immediately adjacent to said second light shielding region received by said subject vehicle is smaller than a threshold value;

determining that the state of said road is straight, when the illumination intensity of the one of the areas immediately adjacent to said second light shielding region received by said subject vehicle is smaller than said threshold value; and determining that the state of said road is curved, when the illumination intensity of the one of the areas immediately adjacent to said second light shielding region received by said subject vehicle is not smaller than said threshold value.

13. The method as set forth in claim 11, further comprising determining whether driving state of said subject vehicle is straight or curved, said vehicle driving state determining comprising cancelling determination that the state of said road is straight, when it is determined that the state of said subject vehicle is curved, said vehicle driving state determining comprising cancelling determination that the state of said road is curved, when it is determined that the state of said subject vehicle is straight.

14. The method as set forth in claim 11, wherein said second illumination intensities are symmetrical with respect to said first light shielding region.

15. The method as set forth in claim 11, wherein said second illumination intensities are asymmetrical with respect to said first light shielding region.

16. The method as set forth in claim 11, further comprising outputting a straight-mode illumination intensity pattern to said headlamp driver, when it is determined that the state of said road is straight, said straight-mode illumination intensity pattern having fifth illumination intensities aimed toward said preceding vehicle, said fifth illumination intensities being decreased to zero to form a third light shielding region, and having sixth illumination intensities of areas adjacent to said third light shielding region, said sixth illumination intensities immediately close to said third light shielding region being larger than said reference value, said sixth illumination intensities apart from said third light shielding region to approach said reference value.

17. A method for controlling an adaptive drive beam mode vehicle headlamp of a subject vehicle travelling a road, comprising:

determining whether or not a preceding vehicle is travelling ahead of said subject vehicle;

determining whether a driving state of said subject vehicle is straight or curved, when it is determined that said preceding vehicle is travelling ahead of said subject vehicle; and outputting a curved-mode illumination intensity pattern to a headlamp driver to drive said subject vehicle headlamp, when it is determined that the state of said subject vehicle is curved, said curved-mode illumination intensity pattern having first illumination intensities aimed toward said preceding vehicle, said first illumination intensities being decreased to zero to form a first light shielding region for said preceding vehicle, and having second illumination intensities of areas adjacent both sides of said first light shielding region, said second illumination intensities being stepwise or continuously increased away from said first light shielding region from zero to a reference value smaller than a maximum value defined by said vehicle headlamp.

18. The method as set forth in claim 16, wherein said sixth illumination intensities are symmetrical with respect to said third light shielding region.

19. The method as set forth in claim 17, further comprising outputting a straight-mode illumination intensity pattern to said headlamp driver, when it is determined that the state of said subject vehicle is straight, said straight-mode illumination intensity pattern having fifth illumination intensities aimed toward said preceding vehicle, said fifth illumination intensities being decreased to form a third light shielding region, and having sixth illumination intensities of areas adjacent to said fifth light shielding region, said sixth illumination intensities immediately close to said third light shielding region being larger than said reference value.

20. The method as set forth in claim 17, wherein said vehicle driving state determining uses one of steering angle data, gyro sensor data and car navigation data.

* * * * *